(12) United States Patent
Miller et al.

(10) Patent No.: US 9,927,940 B2
(45) Date of Patent: Mar. 27, 2018

(54) METHOD AND APPARATUS ACCOUNTING FOR INDEPENDENT COGNITIVE CAPACITIES IN THE RIGHT VS. LEFT HALF OF VISION

(75) Inventors: Earl Keith Miller, Cambridge, MA (US); Timothy Joseph Buschman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 315 days.

(21) Appl. No.: 13/486,762

(22) Filed: Jun. 1, 2012

(65) Prior Publication Data
US 2012/0308972 A1  Dec. 6, 2012

Related U.S. Application Data
(60) Provisional application No. 61/492,877, filed on Jun. 3, 2011.

(51) Int. Cl.
*G06F 3/048* (2013.01)

(52) U.S. Cl.
CPC .................. *G06F 3/048* (2013.01)

(58) Field of Classification Search
CPC ..... G06T 15/00; G06F 3/048; H04N 13/0438; H04N 13/0459; H04N 13/0468;
(Continued)

(56) References Cited

U.S. PATENT DOCUMENTS

| 5,911,581 | A | 6/1999 | Reynolds |
| 6,231,187 | B1 * | 5/2001 | Munoz et al. ............... 351/209 |

(Continued)

FOREIGN PATENT DOCUMENTS

| GB | 2469278 A | 10/2010 |
| WO | WO 2012/167123 A1 | 12/2012 |

OTHER PUBLICATIONS

Marvin M Chun and Jeremy M. Wolfe, 'Chapter 9: Visual Attention', Copyright 2001, 2005, Blackwell Handbook of Sensation and Perception[online], p. 287.*

(Continued)

*Primary Examiner* — Robert P Bullington
(74) *Attorney, Agent, or Firm* — Hamilton, Brook, Smith & Reynolds, P.C.

(57) ABSTRACT

A method of displaying information includes presenting representations of information in a manner accounting for independent cognitive capacities corresponding to a subject's left and right halves of visual space. Weightings of importance may be assigned to the information and used to display the representations in the left half or the right half of the visual space with zero or few other representations. Presenting the representations can also include inspecting content of the information and determining a position on a display to present the content as a function of the information previously, currently, or in the future displayed on the display. In a display system, a presentation unit is configured to present, e.g. generate, representations of information in a manner accounting for the independent cognitive capacities, and a display unit is configured to display the representations. Displaying information can include arranging physical objects in locations of a subject's expected visual space.

33 Claims, 14 Drawing Sheets

(58) Field of Classification Search
CPC .. G09B 19/00; G09B 9/00; A61B 5/16; A61B 5/7445
USPC .................................. 434/236, 216; 345/419
See application file for complete search history.

(56) References Cited

U.S. PATENT DOCUMENTS

| | | | |
|---|---|---|---|
| 6,435,878 | B1 | 8/2002 | Reynolds |
| 8,020,993 | B1* | 9/2011 | Fram .............................. 351/204 |
| 2004/0049124 | A1* | 3/2004 | Kullok et al. ................. 600/558 |
| 2009/0018407 | A1* | 1/2009 | Jung et al. ..................... 600/301 |
| 2012/0164618 | A1* | 6/2012 | Kullok et al. ................. 434/323 |
| 2012/0282585 | A1* | 11/2012 | Baer et al. ................. 434/307 R |

OTHER PUBLICATIONS

International Search Report for International Application No. PCT/US2012/040516, dated Sep. 6, 2012.
International of International Preliminary Report on Patentability and the International Preliminary Report on Patentability, dated Dec. 19, 2013, PCT/US2012/040516, "Method and Apparatus Accounting for Independent Cognitive Capacities in the Right vs. Left Half of Vision."
Alvarez GA & Cavanagh P (2004) The capacity of visual short-term memory is set both by visual information load and by number of objects. *Psychol Sci* 15(2):106-111.
Alvarez GA & Cavanagh P (2005) Independent resources for attentional tracking in the left and right visual hemifields. *Psychol Sci* 16(8):637-643.
Anderson DE, Vogel EK, & Awh E (2010) Precision in visual working memory reaches a stable plateau when individual item limits are exceeded. *J Neurosci* 31(3):1128-1138.
Asaad WF & Eskandar EN (2008) A flexible software tool for temporally-precise behavioral control in Matlab. *Neurosci Methods* 174(2):245-258.
Asaad WF & Eskandar EN (2008) Achieving behavioral control with millisecond resolution in a high-level programming environment. *Neurosci Methods* 173(2):235-240.
Awh E, Barton B, & Vogel EK (2007) Visual working memory represents a fixed number of items regardless of complexity. *Psychol Sci* 18(7):622-628.
Barash S, Bracewell RM, Fogassi L, Gnadt JW, & Andersen RA (1991) Saccade-related activity in the lateral intraparietal area. I. Temporal properties; comparison with area 7a. *Neurophysiol* 66:1095-1108.
Barcelo F, Suwazono S, & Knight RT (2000) Prefrontal modulation of visual processing in humans. *Nat Neurosci* 3(4):399-403.
Bays PM & Husain M (2008) Dynamic shifts of limited working memory resources in human vision. *Science* 321(5890):851-854.
Bichot NP, Schall JD, & Thompson KG (1996) Visual feature selectivity in frontal eye fields induced by experience in mature macaques. *Nature* 381(6584):697-699.
Bruce CJ & Goldberg ME (1985) Primate frontal eye fields: I Single neurones discharging before saccades. *Neurophysiol* 53:607-635.
Buschman TJ & Miller EK (2007) Top-down versus bottom-up control of attention in the prefrontal and posterior parietal cortices. *Science* 315(5820):1860-1862.
Buschman TJ & Miller EK (2009) Serial, covert shifts of attention during visual search are reflected by the frontal eye fields and correlated with population oscillations. *Neuron* 63(3):386-396.
Cavanagh P & Alvarez GA (2005) Tracking multiple targets with multifocal attention. *Trends Cogni Sci* 9(7):349-354.
Cowan N (2001) The magical number 4 in short-term memory: a reconsideration of mental storage capacity. *Behav Brain Sci* 24(1):87-114; discussion 114-185.
Cowan N, et al. (2005) On the capacity of attention: Its estimation and its role in working memory and cognitive aptitudes. *Cognitive Psychology* 51(1):42-100.

Curtis CE & D'Esposito M (2003) Persistent activity in the prefrontal cortex during working memory. *Cogni Sci* 7(9):415-423.
Delvenne JF (2005) The capacity of visual short-term memory within and between hemifields. *Cognition* 96(3):B79-88.
Delvenne JF, Kaddour LA, & Castronovo J (2010) An electrophysiological measure of visual short-term memory capacity within and across hemifields. *Psychophysiology* 48:333-336.
Engle RW, Tuholski SW, Laughlin JE, & Conway AR (1999) Working memory, short-term memory, and general fluid intelligence: a latent-variable approach. *J Exp Psychol Gen* 128(3):309-331.
Fukuda K, Awh E, & Vogel EK (2010) Discrete capacity limits in visual working memory. *Curr Opin Neurobiol* 20(2):177-182.
Fukuda K, Vogel E, Mayr U, & Awh E (2010) Quantity, not quality: The relationship between fluid intelligence and working memory capacity. *Psychon Butte Rev* 17(5):673-679.
Funahashi S, Bruce CJ, & Goldman-Rakic PS (1989) Mnemonic coding of visual space in the monkey's dorsolateral prefrontal cortex. *Neurophysiol* 61:331-349.
Fuster JM & Alexander GE (1971) Neuron activity related to short-term memory. *Science* 173:652-654.
Heeger DJ (1992) Normalization of Cell Responses in Cat Striate Cortex. *Visual Neurosci* 9:181-197.
Karatekin C & Asarnow RF (1998) Working memory in childhood-onset schizophrenia and attention-deficit/hyperactivity disorder. *Psychiatry Research* 80(2):165-176.
Lee EY, et al. (2010) Visual working memory deficits in patients with Parkinson's disease are due to both reduced storage capacity and impaired ability to filter out irrelevant information. *Brain* 133(9):2677-2689.
Luck SJ & Vogel EK (1997) The capacity of visual working memory for features and conjunctions. *Nature* 390(6657):279-281.
Marois R & Ivanoff J (2005) Capacity limits of information processing in the brain. *Trends Cogn Sci* 9(6):296-305.
Moran J & Desimone R (1985) Selective attention gates visual processing in the extrastriate cortex. *Science* 229:782-784.
Ninokura Y, Mushiake H, & Tanji J (2003) Representation of the temporal order of visual objects in the primate lateral prefrontal cortex. *J Neurophysiol* 89(5):2868-2873.
Olejnik S & Algina J (2003) Generalized eta and omega squared statistics: measures of effect size for some common research designs. *Psychological Methods* 8(4):434-447.
Palva JM, Monto S, Kulashekhar S, & Palva S (2010) Neuronal synchrony reveals working memory networks and predicts individual memory capacity. *Proc Natl Acad Sci U S A* 107(16):7580-7585.
Raftery AE (1995) Bayesian Model Selection in Social Research. *Sociological Methodology* 25:111-163.
Reynolds JH & Heeger DJ (2009) The normalization model of attention. *Neuron* 61(2):168-185.
Schwarz GE (1978) Estimating the dimension of a model. *Annals of Statistics* 6(2):461-464.
Sperling G (1960) The Information Available in Brief Visual Presentations. *Psychological Monographs: General and Applied* 74(11): 1-29.
Todd JJ & Marois R (2004) Capacity limit of visual short-term memory in human posterior parietal cortex. *Nature* 428(6984):751-754.
Todd JJ & Marois R (2005) Posterior parietal cortex activity predicts individual differences in visual short-term memory capacity. *Cognitive, Affective & Behavioral Neuroscience* 5(2):144-155.
Toth LJ & Assad JA (2002) Dynamic coding of behaviourally relevant stimuli in parietal cortex. *Nature* 415(6868):165-168.
Vogel EK & Machizawa MG (2004) Neural activity predicts individual differences in visual working memory capacity. *Nature* 428(6984):748-751.
Vogel EK, McCollough AW, & Machizawa MG (2005) Neural measures reveal individual differences in controlling access to working memory. *Nature* 438(7067):500-503.
Voytek B & Knight RT (2010) Prefrontal cortex and basal ganglia contributions to visual working memory. *Proc Natl Acad Sci U S A* 107(42):18167-18172.

(56) References Cited

OTHER PUBLICATIONS

Warden MR & Miller EK (2007) The representation of multiple objects in prefrontal neuronal delay activity. *Cereb Cortex 17 Suppl* 1:i41-50.
Wilken P & Ma WJ (2004) A detection theory account of change detection. *Vision* 4(12):1120-1135.
Xu Y & Chun MM (2006) Dissociable neural mechanisms supporting visual short-term memory for objects. *Nature* 440(7080):91-95.
Zhang W & Luck SJ (2008) Discrete fixed-resolution representations in visual working memory. *Nature* 453(7192):233-235.
Buschman, T.J., et al., "Neural Substrates of Cognitive Capacity Limitations," *PNAS Early Edition* [online] Jun. 20, 2011, pp. 1-4, retrieved from the internet URL:www.pnas.org/cgi/doi/10.1073/pnas.1104666108, PNAS Jul. 5, 2011 vol. 108 No. 27, pp. 11252-11255.
Buschman, T.J., et al., Supporting Information Buschman et al. 10.1073/pnas.1104666108, PNAS [online], Jun. 20, 2011, pp. 1-6, [retrieved on Jul. 12, 2012]. Retrieved from the internet URL:http://www.pnas.org/content/suppl/2011/06/14/1104666108.DCSupplemental.
Verleger, R., et al., On why left events are the right ones: neural mechanisms underlying the left-hemifield advantage in rapid serial visual presentation. *J Cogn Neurosci*, 21(3):474-488 (2008).
Finn, E., "When four is not four, but rather two plus two," *MIT News Office*, (Jun. 2011).
Michael S. Gazzaniga et al., Cognitive Neuroscience: The Biology of Mind, Third Edition, W.W. Norton & Company, Inc., p. 179, 2009.
U.S. Appl. 15/679,126, filed Aug. 16, 2017, "Dynamic Display System and Method for Customizing a Controller in a Display System", first named inventor: Earl Keith Miller.

\* cited by examiner

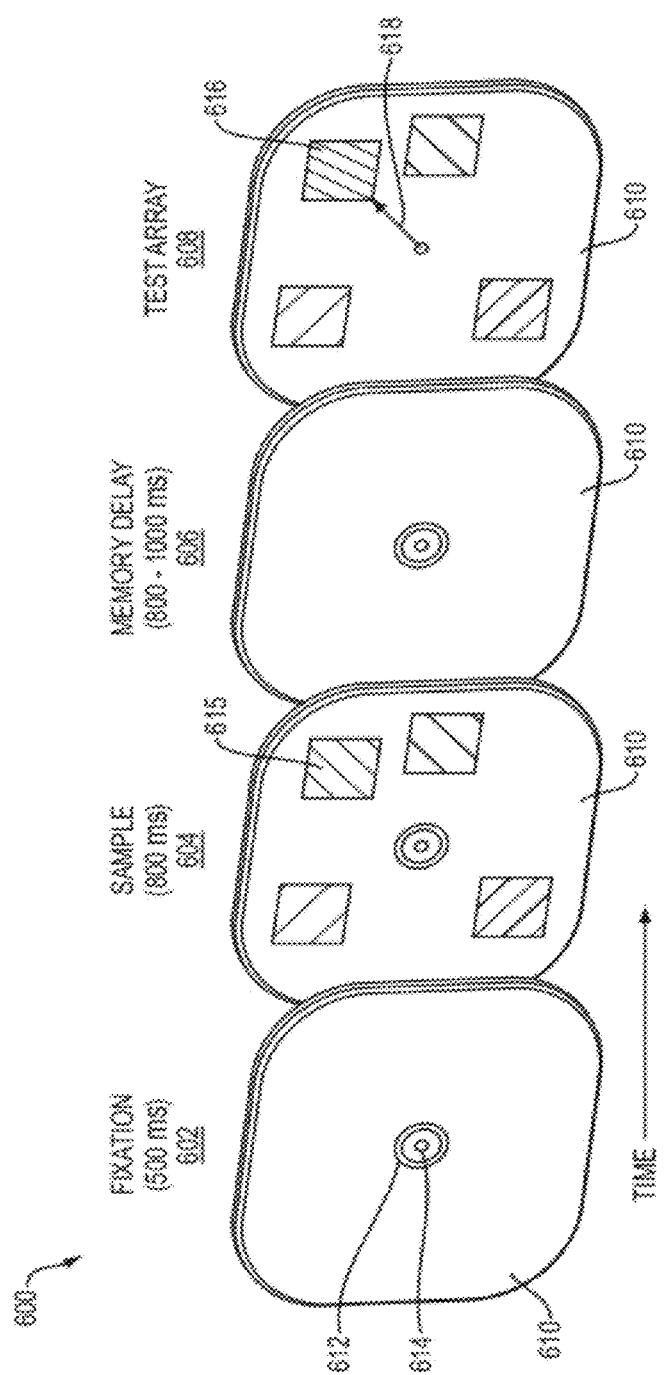

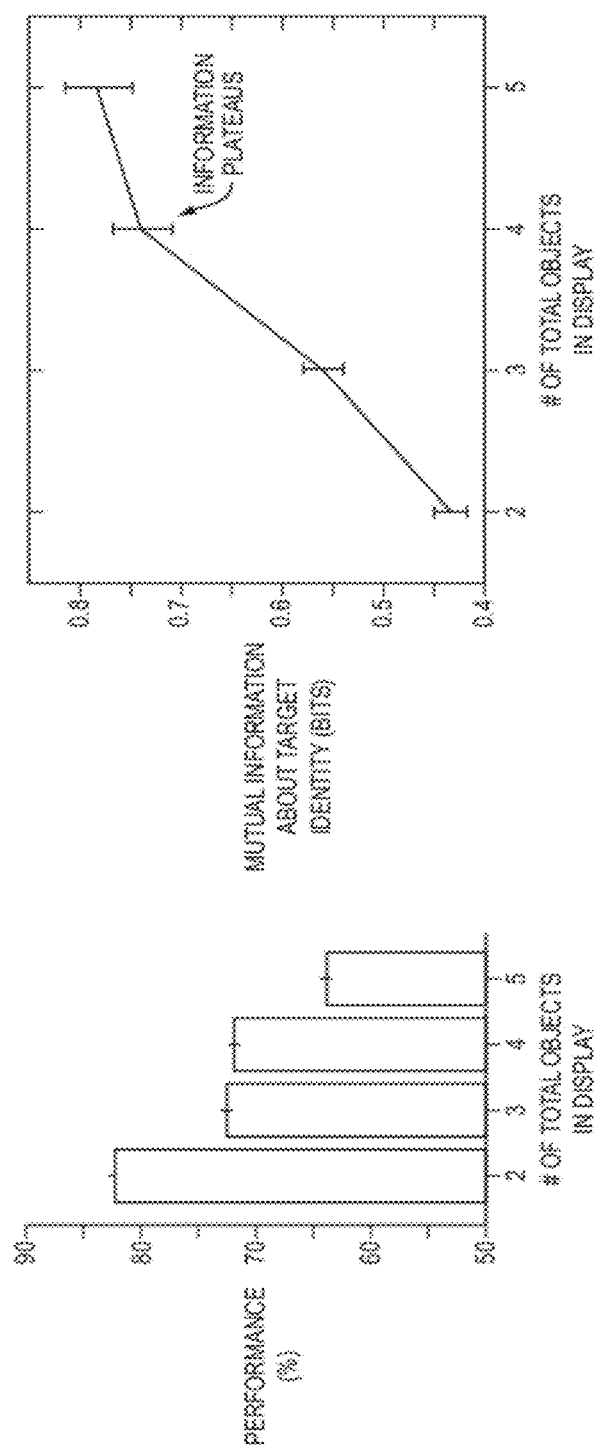

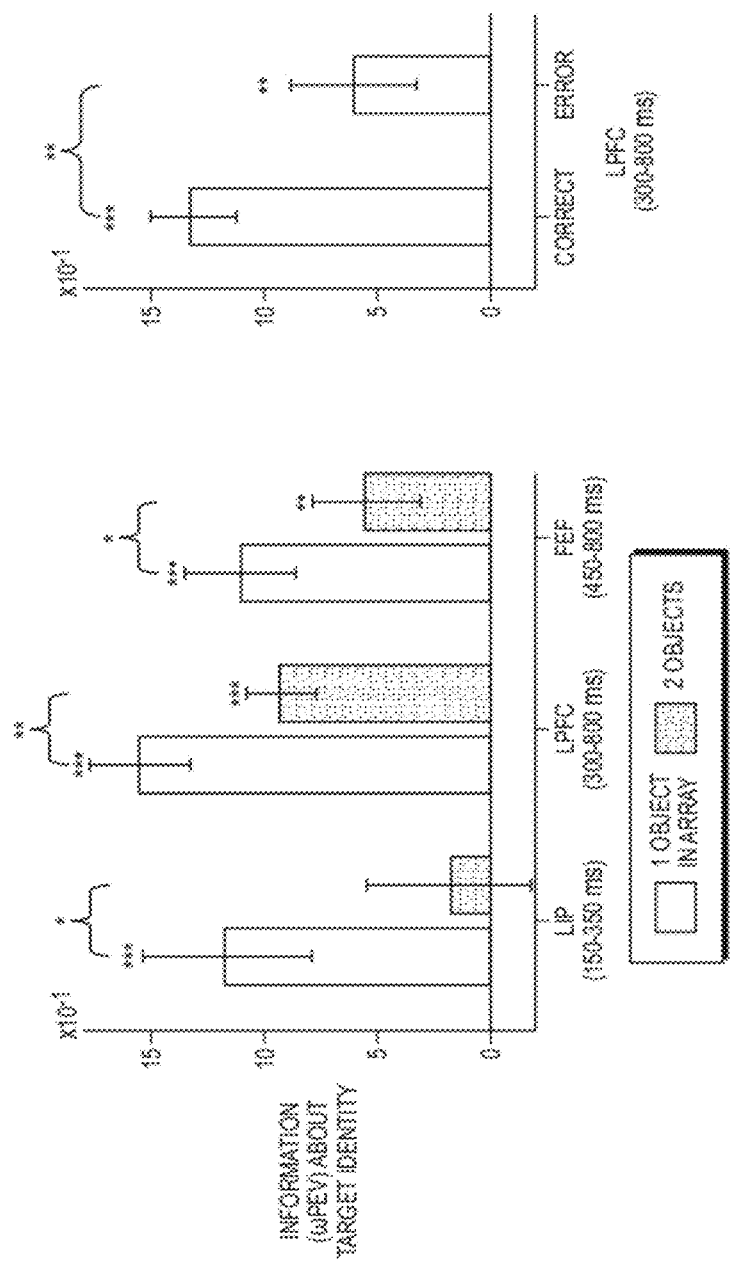

METHOD AND APPARATUS ACCOUNTING FOR INDEPENDENT COGNITIVE CAPACITIES IN THE RIGHT VS. LEFT HALF OF VISION

RELATED APPLICATION

This application claims the benefit of U.S. Provisional Application No. 61/492,877, filed on Jun. 3, 2011.

The entire teachings of the above application are incorporated herein by reference.

GOVERNMENT SUPPORT

This invention was made with government support under Grant No. SMA0835976 awarded by the National Science Foundation and Grant No. 5R01MH091174 awarded by the National Institutes of Health. The government has certain rights in this invention.

BACKGROUND OF THE INVENTION

Despite the remarkable power and flexibility of human cognition, working memory, the "online" workspace that most cognitive mechanisms depend upon, is surprisingly limited: an average adult human has a capacity to retain only four items at a given time. This capacity is fundamental to cognition: individual variability in capacity is highly correlated with their fluid intelligence and patients with neuropsychiatric disorders often have a reduced capacity. Because it is so basic to cognition, capacity limitations have been well-studied in humans, particularly visual short-term working memory. This has led to several competing theories about the neural basis of capacity limitations. "Discrete" models suggest that capacity limitations reflect a limit in the number of objects that can be simultaneously represented. "Flexible resource" models predict that only the total amount of information available is limited, with information divided among all represented objects. It is also not clear whether the limitation is in stimulus encoding or in maintenance.

SUMMARY OF THE INVENTION

A system and method of displaying information includes presenting representations of information in a manner accounting for independent cognitive capacities corresponding to a subject's left and right halves of visual space.

In an embodiment, presenting the representations includes assigning weightings of importance to the information and using the weightings to display the representations in the left half of the visual space or the right half of the visual space with zero or few other representations. Presenting the representations can include using a temporal profile in the left or right half of the visual space to maintain cognitive capacity performance in connection with the respective half. Presenting the representations can also include inspecting content of the information and determining a position on a display to present the content as a function of the information previously, currently, or in the future displayed on the display.

The system and method of displaying information may include monitoring or assuming gaze and dividing a current field of view of the subject in a logical manner based on the gaze to account for the independent cognitive capacities corresponding to the subject's left and right halves of the visual space. Also included may be shifting a heads-up display to align with the current field of view.

The system and method may include capturing at least one metric representative of the independent cognitive capacities. Capturing the at least one metric can include capturing the at least one metric for an individual subject using a test to measure the subject's independent cognitive capacities. Alternatively or in addition, capturing the at least one metric can include capturing the at least one metric generally using data of average population independent cognitive capacities. A display of the representations may be adjusted as a function of the at least one metric representative of independent cognitive capacities. For example, adjusting the display can include adjusting any of number, position, size, color, distribution, density, and symmetry of the representations in the display as a function of the at least one metric representative of independent cognitive capacities. Adjusting the display may include reducing the number of representations in the display when the at least one metric representative of the independent cognitive capacities is low.

In some embodiments, the system and method includes presenting the representations for independent training of left and right halves of the brain to enhance cognition. Training can be therapeutic and may include using knowledge of location of a brain injury, and using knowledge of any combination of gender, age, and education. The independent training can include simultaneous training of the left and right halves of the brain to enhance cognition. Further, the method may include capturing at least one metric representative of cognitive capacities of the left and right halves of the brain of the subject and adapting the training based on the at least one metric, for example, by adapting the training to compensate for working memory deficits of the subject. The training can be application specific, the application including any of human-to-computer interfacing, human-to-machine interfacing, quality assurance monitoring, security monitoring, medical monitoring, or air traffic controlling.

In some embodiments, the representations are presented in overlapping migration in one half of the visual space, or from the left half to the right half of the visual space, or from the right half to the left half of the visual space. When performed for independent training, the method may include monitoring gaze and dividing a current field of view of the subject based on the gaze to account for the independent cognitive capacities of the left and right halves of the visual space. Also included may be displaying the representations and adjusting the displaying as a function of non-visual activities, which may include any of distractions, emotions, time of day, time of month, time of year, age of a subject viewing the display, or combinations thereof. Displaying of the representations may also be adjusted as a function of vigilance of a subject viewing the representations.

Presenting the representations can include generating the representations, filtering the information or the representations, presenting the representations according to a tag associated with the information, or displaying pre-formed images in accordance with one or more tags associated with the information.

An example display system includes a display unit and a presentation unit. The presentation unit is configured to present, e.g., generate, representations of information in a manner accounting for independent cognitive capacities corresponding to a subject's left and right halves of visual space. The display unit is configured to display the representations.

The presentation unit may include an assignment unit configured to assign weightings of importance to the information. The display unit may be configured to use the weightings to display representations with zero or few other representations in the left or right half of the visual space.

In an embodiment, the display system includes a monitor unit configured to monitor gaze and to notify the display unit how to divide a current field of view of the subject in a logical manner based on the gaze to account for the independent cognitive capacities of the left and right halves of the visual space. The display unit may produce a heads-up display and may include an alignment module configured to spatially shift the heads-up display to align with the subject's current field of view. The monitor unit may include a camera.

In an embodiment, the presentation unit includes an inspection unit configured to inspect content of the information and determine a position on a display to present the content as a function of the information previously, currently, or in the future displayed on the display.

The example display system may further include a capture unit configured to capture at least one metric of the independent cognitive capacities. Also included may be an adjustment unit configured to adjust the display of the representations as a function of the at least one metric. Alternatively or in addition, the adjustment unit may be configured to adjust the display of the representations as a function of non-visual activities.

A system and method of displaying information includes arranging physical objects in locations of a subject's expected visual space in a manner accounting for independent cognitive capacities corresponding to the subject's left and right halves of the visual space.

Arranging the physical objects can include presenting the physical objects in plural sets of objects, at least one of the plural sets of objects being presented in the left half of the visual space and at least another of the plural sets of objects being presented in the right half of the visual space. For example, the plural sets of objects can be presented on plural conveyor belts, at least one of the plural conveyor belts being located on the left half of the subject's body and at least another of the plural conveyor belts being located on the right half of the subject's body.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6A illustrates a task timeline of a test of cognitive capacity that includes a change localization task performed by two monkeys.

FIG. 6B is a graph illustrating example results of the cognitive capacity test of FIG. 6A. Behavioral performance decreased as the number of objects in the stimulus array was increased.

FIG. 6C is a graph further illustrating example data obtained using the cognitive capacity test of FIG. 6A. The information the animals had about the entire stimulus array (derived from behavioral performance) increased until four or more objects were in the array, indicating the animals' capacity was between three and four objects. All error bars indicate 95% confidence intervals.

FIGS. 9A-9B are a graphs illustrating example data obtained from two monkeys performing the cognitive capacity test of FIG. 6A. FIG. 9A illustrates that neural information about the identity of the target is significantly lower with a second object, even when the animal correctly identified the change at the target. FIG. 9B illustrates that significant information about target identity is found even on error trials when the animal did not detect the target change, although it is significantly lower than during correct trials. All error bars indicate SEM; significance is marked by * for $p<0.05$; , $p<0.01$; *, $p<0.001$.

DETAILED DESCRIPTION OF THE INVENTION

A description of example embodiments of the invention follows.

The amount of information a person can process from a display, such as a computer display, heads-up display, or television monitor, can be limited because conventional displays do not account for capacity limits in the person's visual hemispheres. Often, conventional displays are unbalanced or present too much information.

Figure 1:
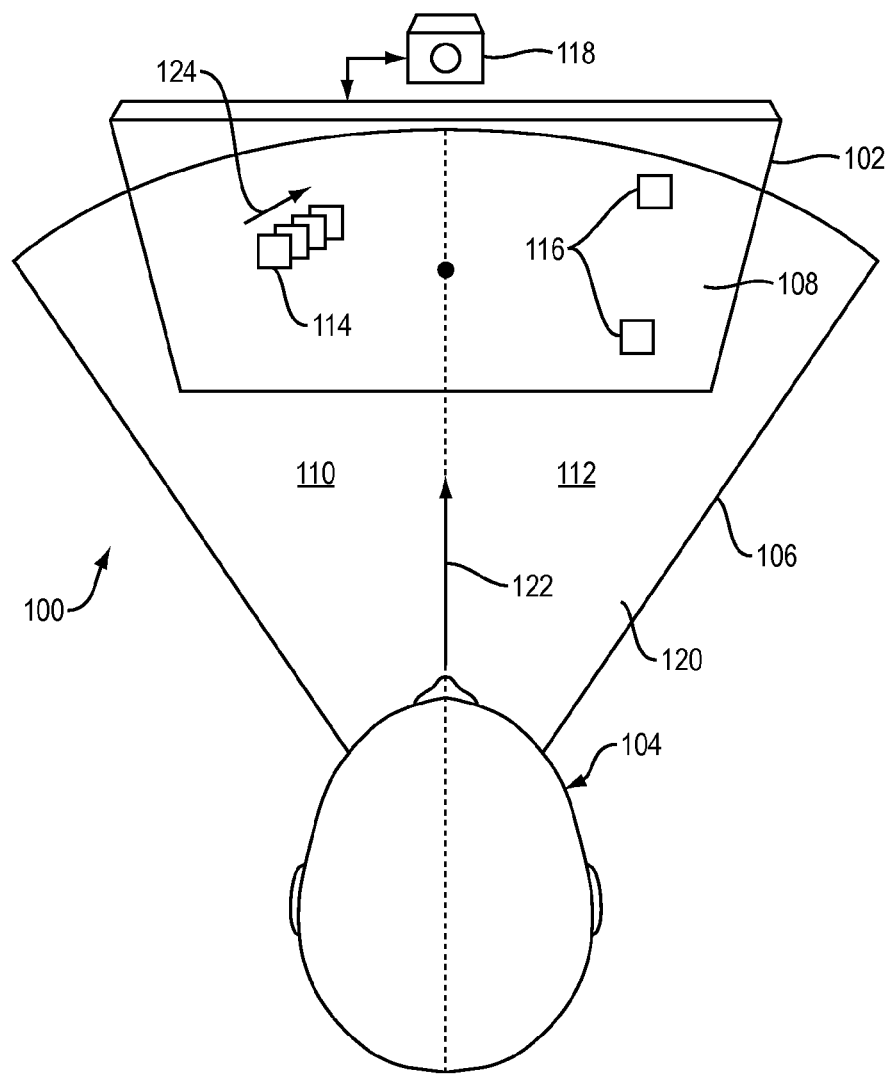
FIG. 1 is a schematic view of one embodiment of a system and method for displaying information.

FIG. 1 illustrates a system and method for displaying information according to an embodiment of the invention. Example system 100 includes a display 102 for displaying the information, or representations thereof, to a subject 104. The subject's visual space 106 schematically illustrated in FIG. 1 as a fan-shaped region, includes a right half 110 and a left half 112. Displaying the information includes generating representations of information 108 in a manner accounting for independent cognitive capacities corresponding to the subject's left and right halves 110, 112 of visual space 106. The display 102 may include a computer or processor configured to perform the various embodiments or aspects of the invention as described herein, including, but not limited to, generating the representations 108 and capturing at least one metric of the independent cognitive capacities. Alternatively, the display may be functionally coupled to a separate computer of processor configured to perform the various embodiments or aspects of the invention.

While the system and method of FIG. 1, and other embodiments described herein, are described with respect to generating and displaying representations of information, the embodiments or concepts described herein may be equally applied to other ways of presenting the representations of information, including filtering the representations or displaying the representations in accordance with one or more tags associated with the information, e.g., in an augmented reality display.

In an embodiment, the representations 108 are generated by assigning weightings of importance to the information and using the weightings to display the representations 108 in the left half 110 of the visual space 106 or the right half 112 of the visual space 106 with zero or few other representations. As shown in FIG. 1, the representations (or objects) include representations (or objects) 114, which are displayed in the left half of the visual space 106, and representations (or objects) 116, which are displayed in the right half of the visual space. The representations 108 may be generated by using a temporal profile in the left or right half of the visual space 106 to maintain cognitive capacity performance in connection with the respective half. In addition, the content of the information may be inspected and a position on the display 102 determined to present the content as a function of the information previously, currently, or in the future displayed on the display 102.

Displaying information may include monitoring or assuming gaze 122 of the subject 104. The gaze 122 may be monitored with a camera 118, which may be a separate camera functionally coupled to the display 102, as shown, or a camera integrated into the display 102. For illustration purposes, the current field of view 120 of the subject 104 is shown in FIG. 1 to coincide with the visual space 106. Displaying the information can include dividing the current field of view 120 in a logical manner based on the gaze 122 to account for the independent cognitive capacities corresponding to the subject's left and right halves 110, 112 of the visual space 106. The display 102, may be a heads-up display (HUD), which may be shifted to align with the current field of view 120.

The system and method 100 may include capturing at least one metric representative of the independent cognitive capacities. The at least on metric may be captured for an individual subject, e.g., the subject 104, using a test to measure the subject's independent cognitive capacities. For example, the test can be administered using display 102 to display the test to the subject 104 and to elicit a response. The subject's response may be captured via an input device, such as a keyboard touch screen, any and all of which may be integrated into display 102, or via camera 118. An example of a cognitive test using a computer display and a camera to monitor gaze (or eye position) is described below with reference to FIG. 6A. Alternatively or in addition, the at least one metric representative of the independent cognitive capacities can be captured generally using data of average population independent cognitive capacities. The display of the representations 108, e.g., on the display 102, may be adjusted as a function of the at least one metric representative of independent cognitive capacities. For example, adjusting the display can include adjusting any of number, position, size, color, distribution, density, and symmetry of the representations 108 in the display 102 as a function of the at least one metric. Adjusting the display may include reducing the number of representations 108 in the display when the at least one metric is low.

The system 100 of FIG. 1 can be used to display or present the representations 108 for independent training of left and right halves of the brain to enhance cognition. Training can be therapeutic and may include using knowledge of location of a brain injury, and using knowledge of any combination of gender, age, and education. The independent training can include simultaneous training of the left and right halves of the brain to enhance cognition. Further, the training can be adapted based on the at least one metric representative of cognitive capacities of the left and right halves of the brain of the subject 104. For example, the training may be adapted to compensate for working memory deficits of the subject 104. The training can be application specific, the application including any of human-to-computer interfacing, human-to-machine interfacing, quality assurance monitoring, security monitoring, medical monitoring, or air traffic controlling. It is understood that the elements of the system 100 of FIG. 1 are illustrative examples only and may be modified for a specific application.

In some embodiments, the presentation of the information, representations of the information, or both in display 102 includes presenting the information or representations, in overlapping migration in one half of the visual space 106, or from the left half 110 to the right half 112 of the visual space, or from the right half 112 to the left half 110 of the visual space. In the example shown in FIG. 1, overlapping migration is schematically shown with respect to representation 114. Representation 114 is presented in overlapping migration in the left half of the visual space 106, as indicated by arrow 124.

In some embodiments, the system 100 of FIG. 1 may adjust the display of the representations 108 as a function of non-visual activities, which may include any of distractions, emotions, time of day, time of month, time of year, age of a subject viewing the display, or combinations thereof. The display of the representations 108 may also be adjusted as a function of vigilance of the subject 104 viewing the representations.

Figure 2:
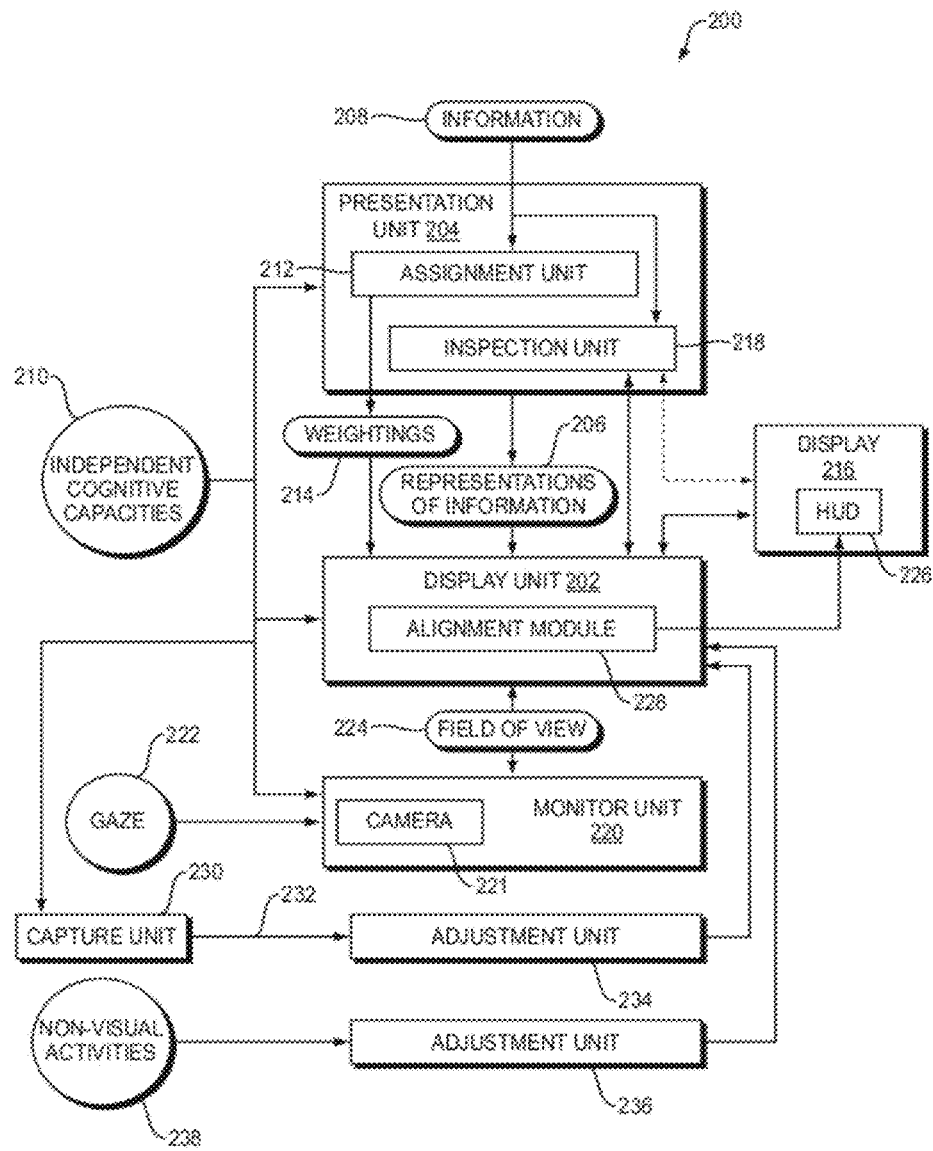
FIG. 2 is a diagram illustrating an embodiment of a display system of the invention.

FIG. 2 is a diagram illustrating an embodiment of a system 200 for displaying information. The display system 200 includes a display unit 202 and a presentation unit 204. The presentation unit 204 is configured to present, e.g., generate or filter, representations 206 of information 208 in a manner accounting for independent cognitive capacities 210 corresponding to a subject's left and right halves of visual space. The presentation unit 204 may include an assignment unit 212 configured to assign weightings 214, e.g., weighting of importance, to the information 208. The display unit 202 is configured to display the representations 206, for example, on a display 216. The display unit 202 may be configured to use the weightings 214 to display the representations 206 with zero or few other representations in the left or right half of the visual space.

In the embodiment shown in FIG. 2, the presentation unit 204 includes an inspection unit 218 configured to inspect content of the information 208 and determine a position on the display 216 to present the content as a function of the information previously, currently, or in the future displayed on the display 216. As shown, the inspection unit 218 communicates with the display unit 202 and may optionally communicate directly with the display 216.

As shown in FIG. 2, the display system 200 includes a monitor unit 220 configured to monitor gaze 222, e.g. gaze of a subject performing a task. In the example shown, the monitor unit 222 includes a camera 221, which may be an infrared camera, that can be used to track the position of the subject's eyes in order to monitor gaze 222. Other ways of monitoring gaze or tracking eye position known in the art may also be used. The monitor unit 222 is configured to notify the display unit 202 how to divide a current field of view 224 of the subject in a logical manner based on the gaze 222 to account for the independent cognitive capacities 210 of the left and right halves of the visual space. The display unit 202 may produce a heads-up display 226, for example, on or in connection with display 216. The display unit 202 may include an alignment module 228 configured to spatially shift the heads-up display 226 to align with the subject's current field of view.

The display system 200 may further include a capture unit 230 configured to capture at least one metric 232 of the independent cognitive capacities 210. Also included may be an adjustment unit 234 configured to adjust the display of the representations, e.g., via display unit 202, as a function of the at least one metric 232. Alternatively or in addition, the display system 200 can include an adjustment unit 236 configured to adjust the display of the representations, e.g., via display unit 202, as a function of non-visual activities 238. Although adjustment units 234 and 236 are shown as separate units, they may be implemented in one unit.

Figure 3A:
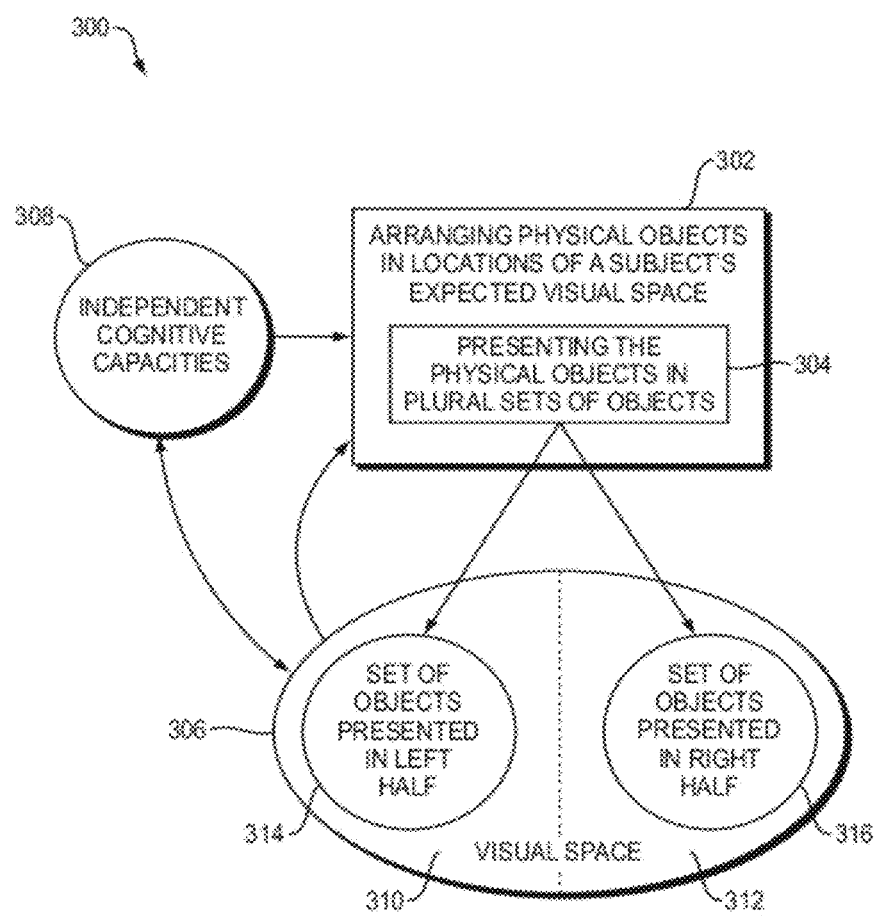
FIG. 3A is a diagram illustrating an embodiment of a method of displaying information.

FIG. 3A illustrates an embodiment of method of displaying information 300 that includes arranging (302) physical objects in locations of a subject's expected visual space 306. The physical objects are arranged in a manner accounting for independent cognitive capacities 308 corresponding to the subject's left and right halves 310, 312 of the visual space 306. As shown, arranging (302) the physical objects can include presenting (304) the physical objects in plural sets of objects. At least one set 314 of the plural sets of objects is presented in the left half of the visual space 310 and at least another set 316 of the plural sets of objects is presented in the right half 312 of the visual space 306.

Figure 3B:
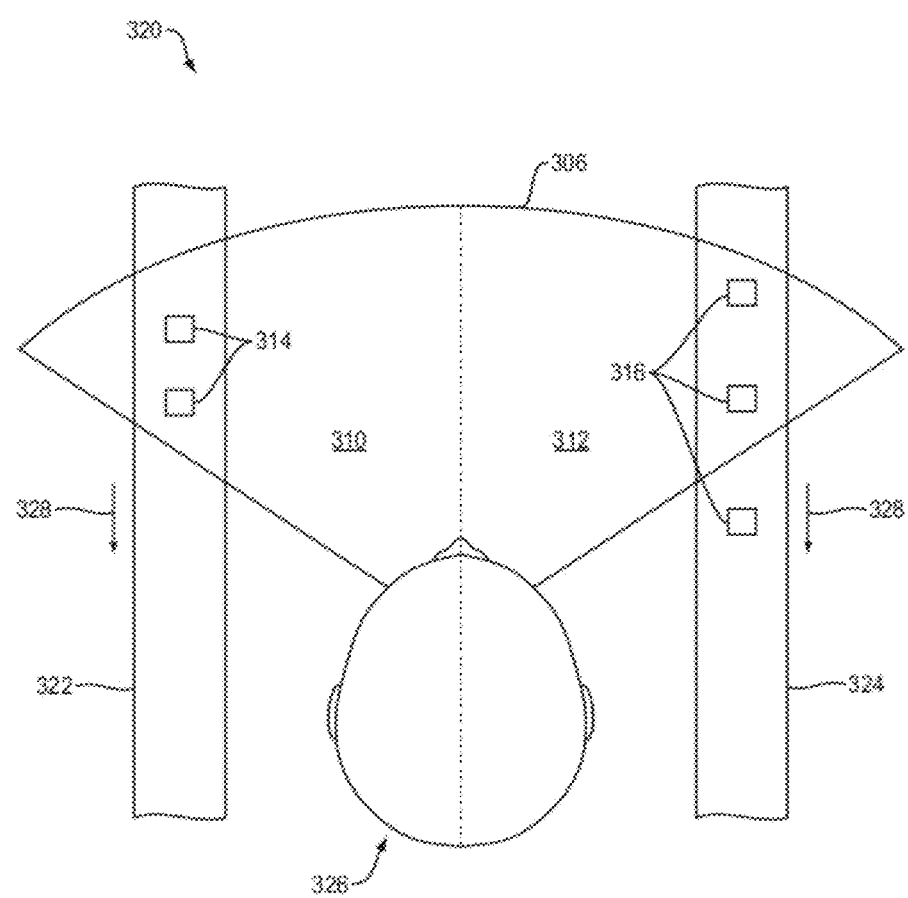
FIG. 3B is a schematic view of an embodiment of a display system according to the method of FIG. 3A.

FIG. 3B is a schematic view of an embodiment of a display system 320 according to the method of FIG. 3A. Plural sets of objects 314, 316 are presented on plural conveyor belts 322, 324. One set of objects 314 is presented in the left half of the visual space 310 and the other set of objects 316 is presented in the right half 312 of the visual space 306. As shown, conveyor belt 322 is located on the left half of the subject's body 326 and the conveyor belt 324 is located on the right half of the subject's body 326. Arrows 328 indicate the direction in which the conveyor belts 322 and 324 cause the physical objects or sets of objects to move. Each conveyor belt may be configured to move the objects in a direction toward the subject 326 or in a direction away from the subject 326. Furthermore, different conveyor belts may cause the objects to move in different directions. In the example shown in FIG. 3B, both conveyor belts cause the objects to move in a direction toward the subject 326.

Applications of Independent Hemispheres

Methods, devices, and systems for displaying information in accordance with embodiments of the principles of the invention can be used to maximize information throughput by ensuring that a display having representations of information accommodates for capacity limits in each visual hemisphere (sometimes referred to as a "hemifield" herein, as in half a field of view) of a subject, e.g., a person observing the display, and that the display remain balanced. It should be understood that a display can be a computer monitor or television screen with representations of physical or computer generated objects, or a display may be a view of physical objects. Embodiments may include a heads-up display, virtual reality glasses, augmented reality glasses, a hand-held wireless device with camera and display, or projectors on a frame of regular vision corrective glasses.

Embodiments can be applied in the field of learning to increase an amount of information learned at a time. Embodiments can also be applied in the field of therapy (and cognitive improvement) to compensate for working memory, perceptual, and cognitive deficits on an individual basis. For example, during therapy, hemispheres can be tested independently, thereby reducing or preventing that the 'strong' hemisphere accommodates for the 'weaker' one. Another application is training that can be used to increase working memory, perceptual, and cognitive capacity, which may be accomplished by embodiments of the present invention through training hemispheres independently and simultaneously, by increasing attentional filtering so as to improve cognitive capacity, or both. Therapeutic and training applications may involve a cognitive game ("brain game"). Furthermore, embodiments can be used to employ application-specific training of independent cognitive capacities. Other real-world applications of the embodiments described herein also include human-computer interfacing, applications for monitoring human activities (e.g., airport security or quality assurance), and tracking of eye position (via one or more cameras) that allows utilizing/training independent capacities in each hemifield.

Improving Human-Computer Interfaces

Methods, devices, and systems for displaying information in accordance with the principles of the invention can be used to change the position and the information density of items to be displayed in order to balance displays and to accommodate for limited capacities in each hemifield. Applications include a heads-up display (HUD), which can be used in airplanes or cars, etc. In one embodiment, a HUD presents information bilaterally in order to improve the ability of a subject, e.g., a pilot or driver, to simultaneously process the information presented. Alternatively or in addition, the information or representations thereof may be highlighted strategically on the HUD. For example, the current speed of a car may be represented as a colorized bar on the left half of the display (or of the visual field of the driver), and the remaining gas/electricity on the right half. Further, warning/alarms, e.g., in an airplane HUD, can be split between the left and right halves of the display or the visual field of the pilot. Other applications include program interfaces, such as program interfaces of handheld electronic devices, personal computers, or human-machine interfaces in an industrial or medical environment, where, for example, status information or updates can be presented bilaterally.

Monitoring Applications

Methods, devices, and systems for displaying or presenting information in accordance with embodiments of the principles of the invention can be used in monitoring applications to divide the display or presentation of information or of physical objects between two hemispheres of a subject performing the monitoring. Examples include Air Traffic Controlling where embodiments can improve capacity to track/monitor planes by automatically splitting the display/representation of the planes into two halves of the display/monitor. Another example includes Quality Assurance (QA) monitoring, where embodiments can increase capacity by monitoring two streams of information or objects simultaneously on each half of a subject's body as compared to a single stream going left to right. Other examples include Transportation Security Administration (TSA) and/or Security Monitoring. Yet another example is Medical Monitoring, where displays of multiple patients can be divided vertically, and single patient displays can present information bilaterally from a central 'fixation' point (see, e.g., FIG. 4B and associated description herein).

Individual Design of Displays

Methods, devices, and systems for displaying information in accordance with embodiments of the principles of the invention can be used to test subjects' capacities in situ and use their individual limit to help design custom displays. Alternatively or addition, embodiments can test other psychophysical parameters (e.g., color blindness, ability to attend and/or filter distractors, etc). Furthermore, some embodiments can automatically change the display of information in order to ensure information is presented in an appropriate manner. For example, subjects with lower capacities (e.g., as compared to a population average) may be presented with fewer representations of information or objects in order to ensure information that does exist or that is displayed is not compromised. In addition, if a subject has unequal capacities in each hemisphere, one can use an embodiment of the principles described herein to design a display or adjust the display to display information according to the unequal capacities.

Figures 4A, 4B:
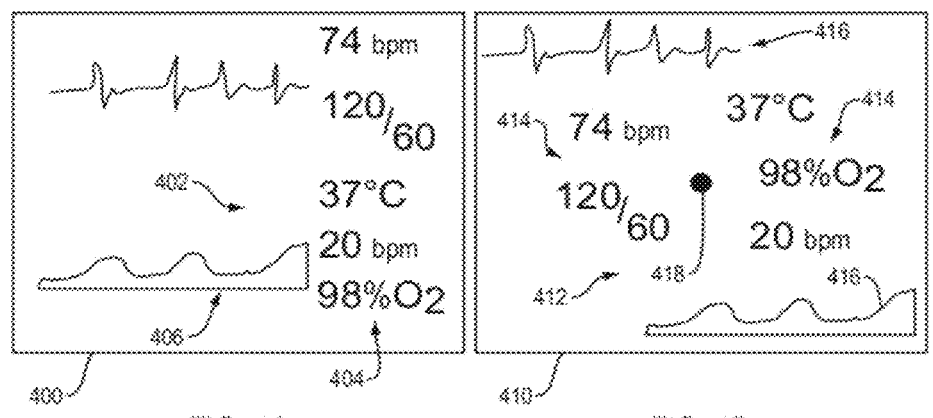
FIG. 4A illustrates a conventional patient display.
FIG. 4B illustrates a patient display in accordance with an embodiment of the principles of the present invention.

FIG. 4A illustrates a conventional patient display 400. Patient information 402, such as heart rate, temperature, blood pressure, and blood oxygenation, is displayed without taking into account the independent cognitive capacities of the hemifields. As shown, the display is imbalanced. Patient information in numerical format 404 is presented in a narrow region toward the right side of the display 400. Patient information in graphical format 408 is displayed in a region extending across the middle toward the left side of the display 400.

FIG. 4B illustrates a patient display 410 in accordance with an embodiment of the principles of the present invention, where patient information 412, such as heart rate, temperature, blood pressure, and blood oxygenation, is displayed bilaterally from a central 'fixation' point 418, utilizing the viewer's independent hemifield capacities in order to increase information processing. Both numerical information 414 and graphical information 416 are displayed bilaterally form the central point 418.

Figure 5:
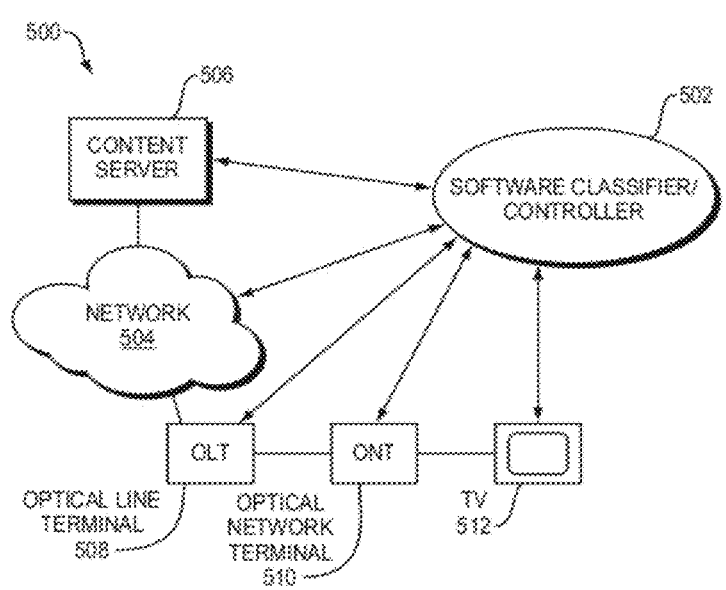
FIG. 5 illustrates deployment of a software classifier or controller in an information network or other network according to an embodiment of the principles of the present invention.

FIG. 5 illustrates a system and method of displaying information 500 that includes deployment of a software classifier or controller 502 in an information network or other network 504 according to an embodiment of the principles of the present invention. The software classifier or controller 502 can be deployed at any location in the network 504, including devices that are part of or connected to the network, such as a content server 506, optical line terminal (OLT) 508, optical network terminal (ONT) 510, or display device 512, e.g., a television (TV) or personal computer (PC). In one example, the software classifier or controller 502 inspects content of the information provided by the content server 506 and attaches or associates a label or tag to the information. Such a label or tag may be based on assigned weightings of importance of the information. A browser, such as an Internet browser running on TV or PC 512, or a software filter can interpret the label or tag to decide where to place the information, or a representation of the information, on a display, such as the screen of TV or PC 512.

Although the examples described herein primarily relate to display of real world information, other embodiments do not require a display, such as presentation of material or objects on conveyor belts, product placement, robotic surgery, and instrumentation panels.

Embodiments of the present invention can be implemented in hardware, firmware, or software. If implemented in software, the software can be any language capable of performing embodiments or aspects of the invention described herein. The software can be stored on any form of non-transitory computer-readable media and loaded and executed by an application-specific or general-purpose processor, also capable of performing embodiments of the invention described herein.

EXEMPLIFICATION

The cognitive capacity test and example results presented below have been described in the article by Buschman, T. J., et al., "Neural Substrates of Cognitive Capacity Limitations," *PNAS Early Edition* [online] Mar. 23, 2011, pp. 1-4, PNAS Jul. 5, 2011 Vol. 108 No. 27, pp. 11252-11255. The article contains supporting information available online.

Introduction

To better understand the neural basis of capacity limitations Applicants simultaneously recorded from single neurons in the prefrontal and parietal cortex of two monkeys trained to perform a typical human test of cognitive capacity: change localization (see FIG. 6A). Two arrays of objects (colored squares) were separated by a short memory delay. In the second array, the color of a randomly chosen object (the target) was changed. Monkeys were trained to detect this change and saccade to it. Cognitive load was increased by varying the number of objects in the arrays from two to five. Applicants recorded simultaneously from multiple electrodes in the frontal cortex (lateral prefrontal cortex, LPFC and frontal eye fields, FEF) and the parietal cortex (lateral intraparietal area, LIP). These areas were chosen as they are critical for short-term memory and human studies implicate them in capacity limitations.

FIG. 6A illustrates a task timeline 600 of a test of cognitive capacity that includes a change localization task. The tasks include a fixation task 602, a sample task 604, a memory delay task 606, and a test array task 608. Animals fixated (indicated by circle 612) on a fixation point 614 displayed on a stimulus display 610 to start a trial. A sample array 604 was presented for 800 ms. The sample array 604 included two to five objects, e.g., object 615, and ranging from zero to three objects in each hemifield. After a brief memory delay 606 (800 to 1000 ms), a test array 608 was displayed on the display 610. The test array 608 was identical to the sample array 604, except one object 615 (the target) had changed color as indicated at 616. The animals were trained to identify the changed object 616 by making a single, direct saccade to it, as illustrated by arrow 618 in FIG. 6A.

Results

Like in humans, increasing the number of objects decreased performance (84.8% correct with two objects to 66.5% with five objects, FIG. 6B). The amount of information the monkeys had about the objects in the array, calculated from their behavior (see Supporting Information below), increased from two to four objects, but then saturated, reflecting a limited capacity (FIG. 6C; 2<3, $p<10^{-15}$; 3<4, $p<10^{-15}$; 4<5, p=0.12, two-tailed permutation test). A capacity-limited model fit the animals' information significantly better than a simpler linear model (p=0.026, validation test, see Supporting Information below for details). Both monkeys' capacities were similar (3.88 monkey Sp, 3.87 monkey Si), with an average of 3.88 objects (95% CI: 3.82-3.93; see Supporting Information below). This is slightly smaller than the average adult human capacity (typically around 4 items).

Figure 7A:
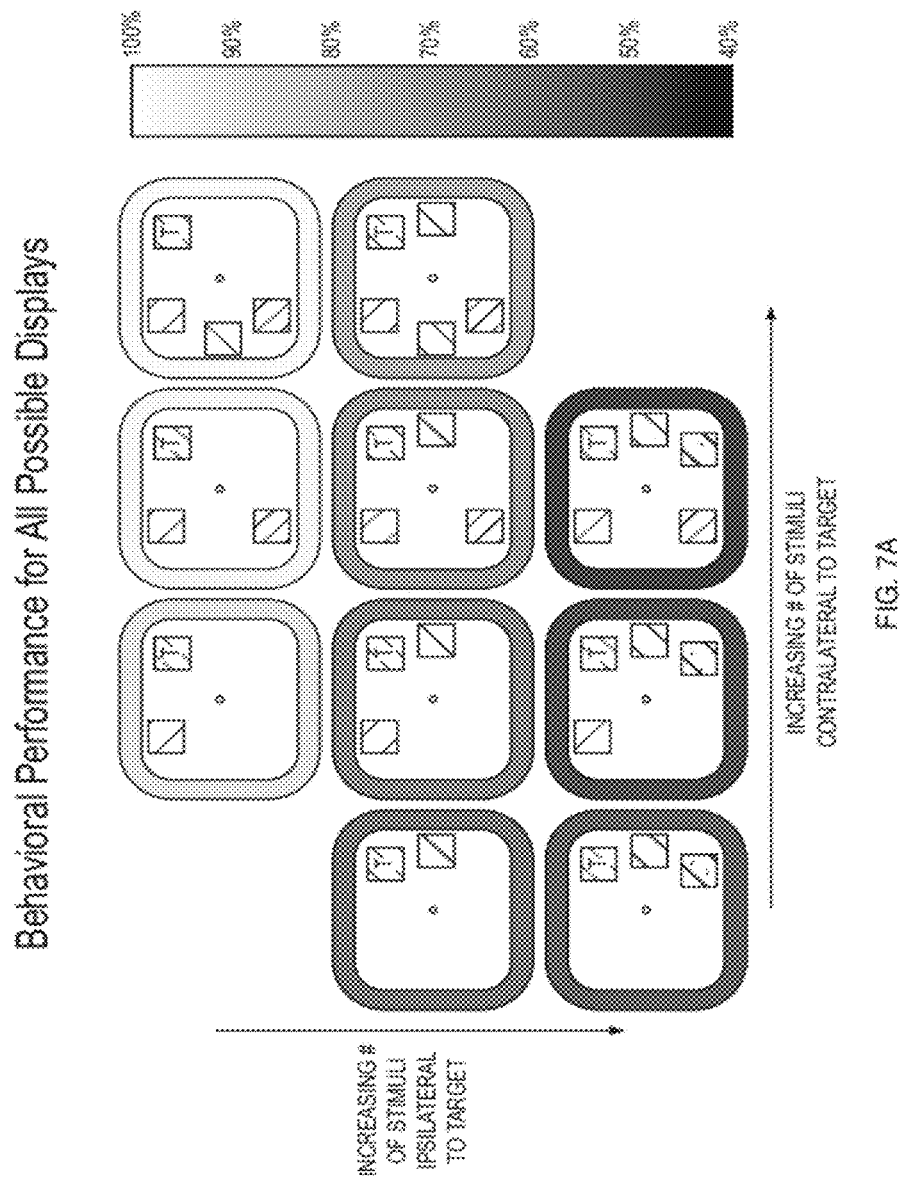
FIG. 7A illustrates example behavioral performance (indicated by the shading of the border/background) for all possible stimulus displays of the cognitive capacity test of FIG. 6A. Adding objects to the same side (ipsilateral) as the target (marked with a 'T') impaired performance (rows), while adding objects to the other side (contralateral) had no effect. This is indicative of separate capacities in each hemisphere.

Closer examination of the monkeys' behavior revealed that their total capacity was composed of two independent, smaller, capacities in the right and left halves of visual space (hemifields). Adding objects to the same hemifield as the target strongly degraded performance (FIG. 7A, rows), while objects in the opposite hemifield had no impact (FIG. 7A columns, Ipsilateral-effect $p<10^{-15}$, Contralateral-effect p=0.202, 2-way ANOVA). The number of same-hemifield objects accounted for over 95% of the behavioral effect of the total number of objects. The information the animals had about each hemifield increased with a second object, but then was saturated (FIG. 7C; 2>1, $p<10^{-15}$; 3>2, p=0.58, two-tailed permutation test). Again, a non-linear, capacity-limited model fit significantly better than a linear one (p=4.4*$10^{-4}$, validation test). The estimated per-hemifield capacity was 1.6 objects (95% CI was 1.60-1.64; capacity of 1.74 for Sp and 1.51 for Si).

Neural activity also showed independent capacities for each visual hemifield. For example, average object information in LPFC neurons decreased with increasing number of objects in the same hemifield (FIG. 7D, left), but not the opposite hemifield (FIG. 7D, right; Ipsilateral-effect, p=0.008, Contralateral-effect, p=0.89, 2-way ANOVA). Applicants found the same effect during the memory delay (Ipsilateral-effect, p=0.006, Contralateral-effect, p=0.52, 2-way ANOVA). This cannot reflect attention to one hemifield or switching attention between them; the monkeys could not predict which object would change and performance was well above that expected from those strategies.

Is the brain's capacity limit a bottom-up failure to perceptually encode objects or a top-down failure to retain objects in memory? A perceptual encoding failure predicts that, when capacity is exceeded, object information is lost during neurons' sensory responses and in lower-order before higher-order cortex. A memory failure predicts a loss later (after encoding) and in higher cortical areas first. Applicants found the former, as will now be described.

Figure 8A:
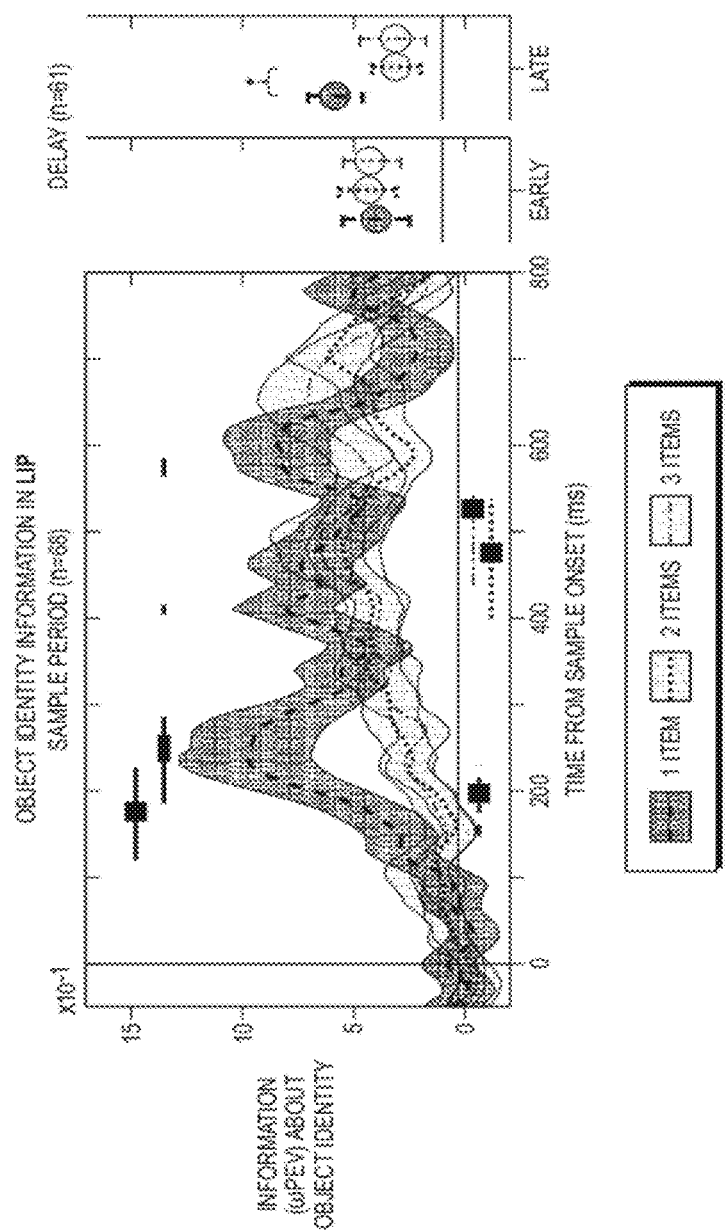
FIGS. 8A-8C illustrate average information about object identity for object selective neurons in (FIG. 8A) the lateral intraparietal cortex (LIP), (FIG. 8B) the lateral prefrontal cortex (LPFC), and (FIG. 8C) the frontal eye fields (FEF). The data were obtained from neural recordings in two monkeys performing the cognitive capacity test of FIG. 6A.
Figure 8B:
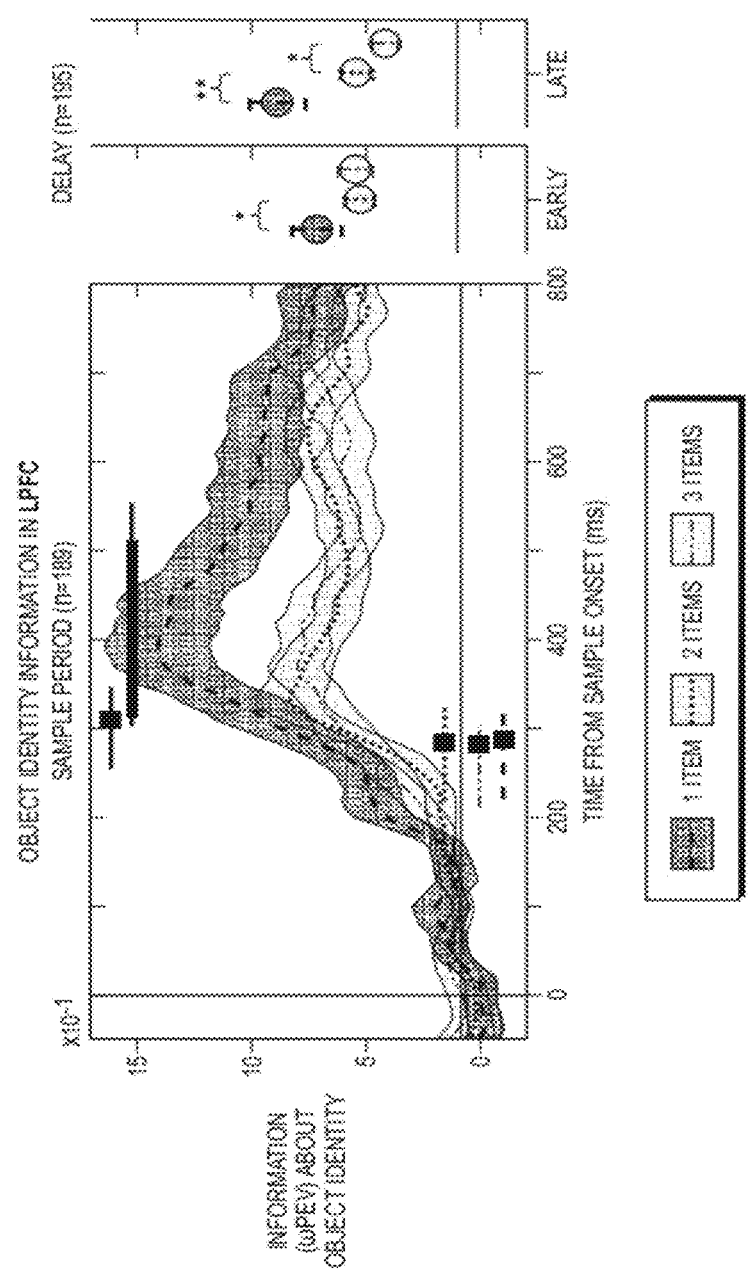
Figure 8C:
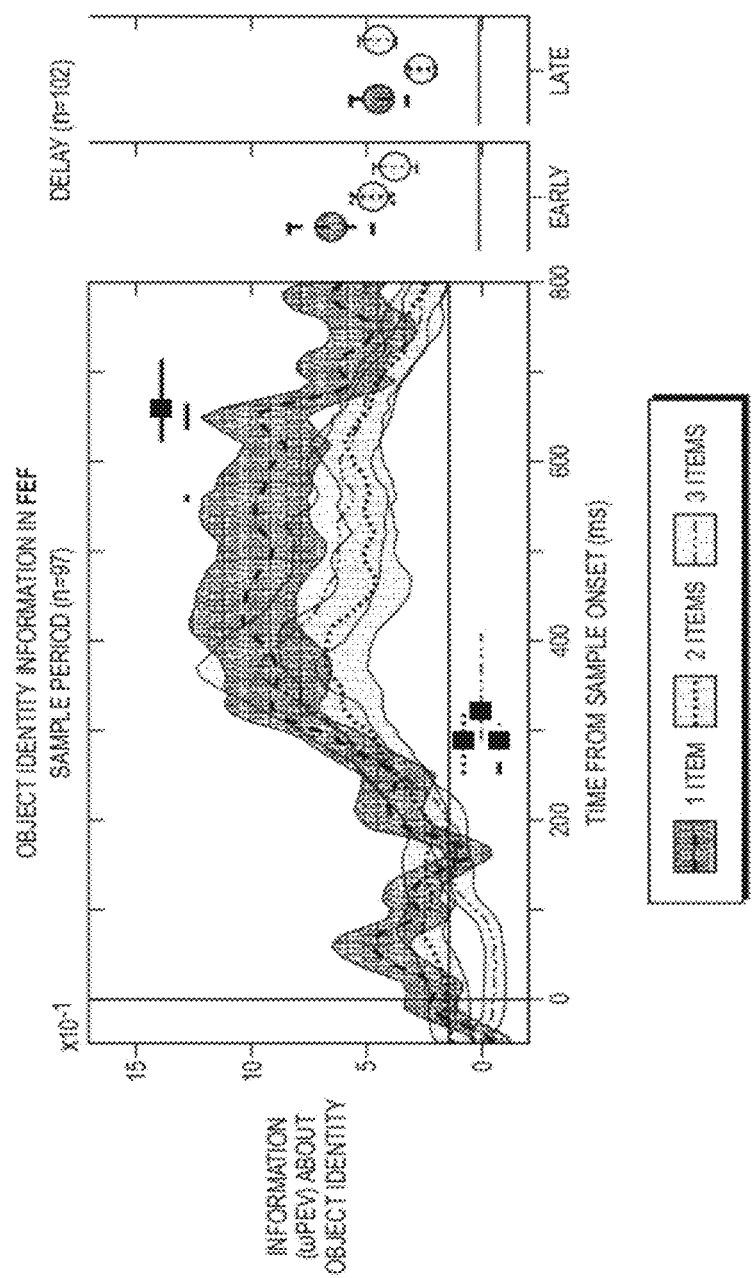

FIGS. 8A-8C illustrate average information about object identity for object selective neurons in (FIG. 8A) the lateral intraparietal cortex (LIP), (FIG. 8B) the lateral prefrontal cortex (LPFC), and (FIG. 8C) the frontal eye fields (FEF). Information about an encoded object is shown when the object was presented alone (black), with another object (two total items, gray), and with two other objects (three total objects, light gray). Shaded region indicates SEM. Information is shown over time for the sample period (FIGS. 8A-8C left). The time at which information about the object was above baseline is indicated for one, two, and three items as black, gray, and light gray squares with associated lines depicting 95% CI. Information is lost in all three areas when the stimulus array is above the animals capacity (i.e. information with two and three objects is less than with one object). Significant difference between one and two or three objects is indicated by black bars (thin, p<0.05; thick, p<0.01). The time to first significant loss (p<0.05) is shown as a black square at the top of each figure, with horizontal lines indicating 95% CI. Applicants computed the neural latency for object selectivity as the time of the steepest rise in neural information around when it first became significant. This statistic is resistant to changes in statistical power, allowing for comparison across areas (see Supporting Information below). The timing of information loss (first in LIP, followed by LPFC, and then FEF) suggests information is lost in a bottom-up manner. FIGS. 8A-8C, right, show information over early (first 400 ms) and late (second 400 ms) in the delay period. Dark shading of circle indicates significant information above baseline. Significant differences between one or two and two or three objects are indicated in black above.

Below capacity (one object/hemifield), object information appeared in LIP early after sample array onset (193 ms [95% confidence interval 149-229 ms]; FIG. 8A), followed by LPFC (317 ms [249-359 ms]; FIG. 8B) and FEF (291 ms [249-339 ms]; FIG. 8C, LIP<LPFC, $p<10^{-3}$; LIP<FEF, p=0.003, randomization test), consistent with a bottom-up flow of sensory information from parietal to frontal cortex. By comparing below to above capacity activity, the latency for information loss was computed (FIGS. 8A-8C, compare black curve to gray/light gray curves). Information loss began soon after array onset and immediately in LIP activity (191 ms [139-249 ms]; FIG. 8A, black square), earlier than in the LPFC (341 ms [289-379 ms]; FIG. 8B, black square) and FEF (658 ms [599-709 ms]; FIG. 8C, black square, LIP<LPFC, $p<10^{-3}$; LIP<FEF, $p<10^{-3}$; LPFC<FEF, $p<10^{-3}$, randomization test). In fact, when capacity was exceeded (two to three objects per hemifield), information in LIP was weak and did not reach significance until after LPFC and FEF (all $p<10^{-3}$, FIGS. 8A-C and Supporting Information below). Individual neurons showed similar effects, with over 85% of neurons selective in both below and above capacity displays showing a decrease in information when displays were above capacity (p=4*$10^{-8}$ across all areas, see Supporting Information below). Information loss above capacity carried through the memory delay (FIGS. 8A-8C, right) with the LPFC showing a further reduction of information for three vs. two objects late in the delay (p=0.047, randomization test). One possibility is that this delayed difference between two and three item displays reflects an unbounded (or less limited) source of information available during sample presentation but lost during the memory delay (e.g. iconic memory, see Supporting Information below).

A limited capacity to represent multiple objects was evident on a behavioral and neural level. But what is the neural mechanism underlying this bottleneck? Two main hypotheses have been put forth. First, objects could compete for encoding within a limited number of discrete "slots", with each object being either successfully or unsuccessfully encoded. Alternatively, capacity limitations could reflect a limited information "pool" that is flexibly divided among objects, and so adding objects reduces the information allotted to each encoded object. Applicants' behavioral and neural data suggest that the two hemifields act like two slots. Applicants tested whether encoding was also slot-like within a hemifield.

A pure slot-like model predicts that encoding an object is all-or-none: if successfully remembered, there should be an equal amount of information about it regardless of how many other objects are in the array. If an object is forgotten, there should be no information about it. In contrast, Applicants found that even when a given target object was successfully encoded and retained, information about that specific object was reduced in all three areas when another object was added to its hemifield (FIG. 9A, 1>2 objects: LIP, p=0.033, 150-350 ms after array onset; LPFC, p=0.001, at 350-800 ms; FEF p=0.041 at 400-800 ms, permutation tests). Further, when the change to an object was not detected, it was not completely missing from neural activity: there was still significant information in LPFC neurons during the presentation of the sample array (FIG. 9B, p=0.0052, permutation test), albeit significantly reduced from correct trials (FIG. 9B, p=0.008, permutation test), that continued into the memory delay (p<0.001, permutation test).

Discussion

Three main results are reported. First, capacity limits were seen in the initial perceptual encoding and not as a memory failure. When capacity was exceeded, information was lost during the initial neural response to the stimulus and in parietal before frontal cortex. This is supported by other work showing that a subject's ability to attentively filter information is a major factor in their effective capacity size. It is also consistent with the second main result of two independent capacities in the right and left half of visual space. The bottleneck begins in posterior cortex where neural receptive fields are more restricted to one hemifield than in prefrontal cortex. Human studies report varying degrees of hemifield independence. In the task described herein, the need to localize the changed object may emphasize this independence. Indeed, the strongest evidence for human hemifield independence comes from divided-attention tasks like multiple object tracking.

Discrete-resource models suggest that capacity depends on a limited number of slot-like, independent resources while flexible-resource models suggest a resource pool that can be subdivided among items. Results presented herein suggest both mechanisms are at play. The two hemifields act like discrete resources, while within a hemifield neural information is divided among objects in a graded fashion. This model is supported by human psychophysical experiments indicating graded information resources within slots. It is also consistent with observations that information about multiple objects multiplex in PFC neurons as if the objects are shared among them. One intriguing possibility is that the neural mechanism underlying the observed decay in information is similar to the competition observed during inattention, although here the animal's task is to attend-to and remember all of the stimuli. Interestingly, parietal neurons seem to have a more severe capacity limitation than frontal regions. Indeed, there were no above-capacity responses until after activation of frontal cortex, suggesting top-down influences may be needed to partially overcome capacity limits. This finding also necessitates information reaches prefrontal cortex from sources other than parietal. A likely candidate is the ventral stream, suggesting further experiments may be needed to fully understand the dynamics of capacity limits throughout the visual system.

In sum, the results presented herein suggest that visual capacity limits result from competition for encoding within several independent, but limited pools of neural information that can each be divided among multiple objects.

Materials and Methods

Please see the Supporting Information below for a detailed description of all materials and methods.

Animals and Recordings.

Two adult rhesus monkeys (*Macaca mulatta*) were trained to perform a change localization task (see FIG. 6A and associated description). After a short fixation period (500 ms) an array of colored squares was presented for 800 ms (the sample period). A long sample period was chosen to ensure the animal had enough time to fully attend to and process all of the items in the array. Following the sample period the stimuli were removed for a memory delay that ranged from 800 to 1000 ms. A second array was then presented that was identical to the sample array except the color of a single randomly chosen object (the target) was changed. The animal was rewarded for making a single, direct, saccade to it. Six new stimulus locations were chosen each day, ranging from +/−75 angular degrees from horizontal meridian and between 4 and 6 degrees of visual angle (dva) from fixation. Stimuli were colored squares 1 dva on a side. Two colors were randomly chosen for each location every day, preventing the monkeys from adopting any long-term memorization strategies. An infrared-based eye-tracking system monitored eye position at 240 Hz (ISCAN, Inc, Woburn, Mass.). Behavioral control of the paradigm was done with the Monkeylogic program. Monkeylogic is a MATLAB® toolbox for the design and execution of psychophysical tasks with high temporal precision (see Asaad WF & Eskandar EN (2008) A flexible software tool for temporally-precise behavioral control in Matlab. *Journal of neuroscience methods* 174(2):245-258; Asaad W F & Eskandar E N (2008) Achieving behavioral control with millisecond resolution in a high-level programming environment. *Journal of neuroscience methods* 173(2):235-240).

Simultaneous recordings were made from single neurons in prefrontal cortex (lateral prefrontal cortex, LPFC, 584 neurons; frontal eye fields, FEF, 325 neurons) and the parietal cortex (lateral intraparietal area, LIP; 284 neurons). All procedures followed the guidelines of the Massachusetts Institute of Technology (MIT) Committee on Animal Care and National Institutes of Health (NIH). Epoxy-coated tungsten electrodes (FHC Inc, Bowdoin Me.) were used for recording. Electrodes were lowered using a custom-built microdrive assembly with 1 mm spacing.

Estimating Behavior Capacity

Figure 7C:
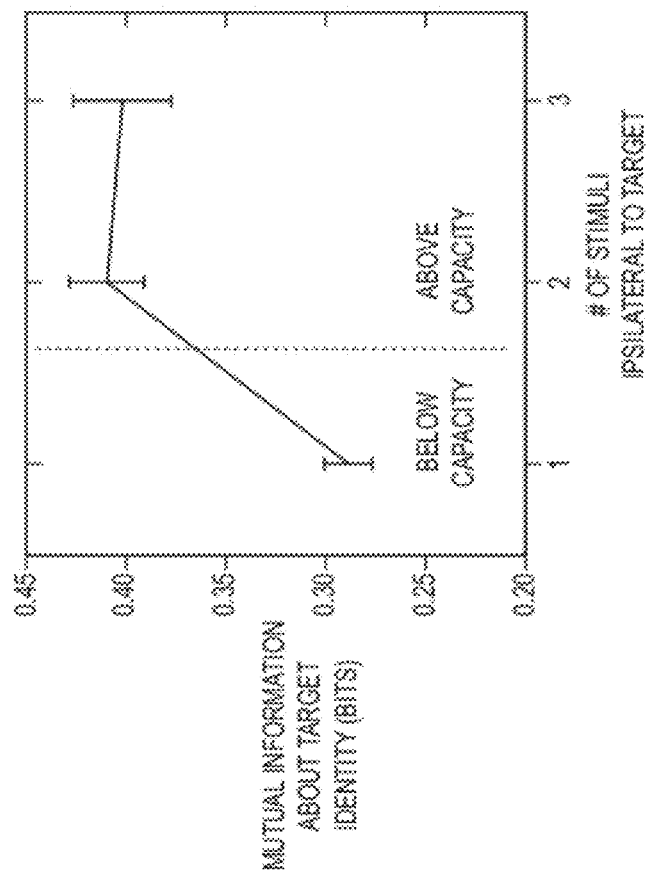
FIG. 7C is a graph further illustrating example data obtained using the cognitive capacity test of FIG. 6A. The information the animal had about the ipsilateral stimulus array (derived from behavioral performance) increased until two or more objects, reflecting the animal's capacity was between one and two objects in each hemifield.
Figure 7B:
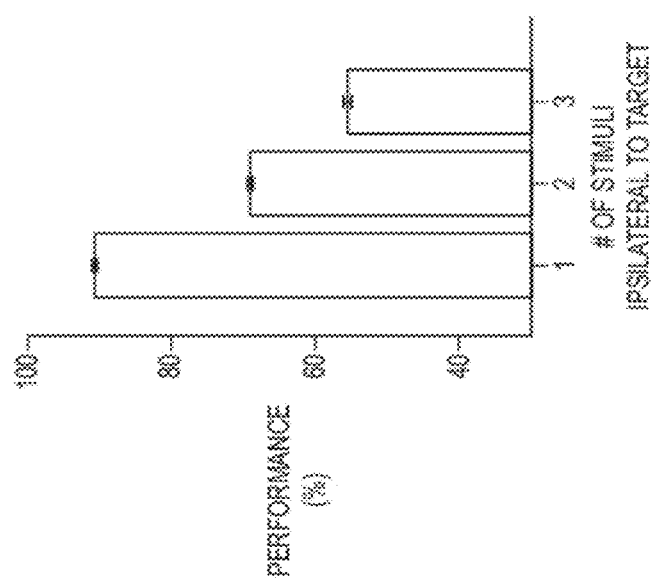
FIG. 7B further illustrates example behavioral performance of the cognitive capacity test of FIG. 6A. Behavioral performance decreased as the number of objects ipsilateral to the target was increased.
Figure 7D:
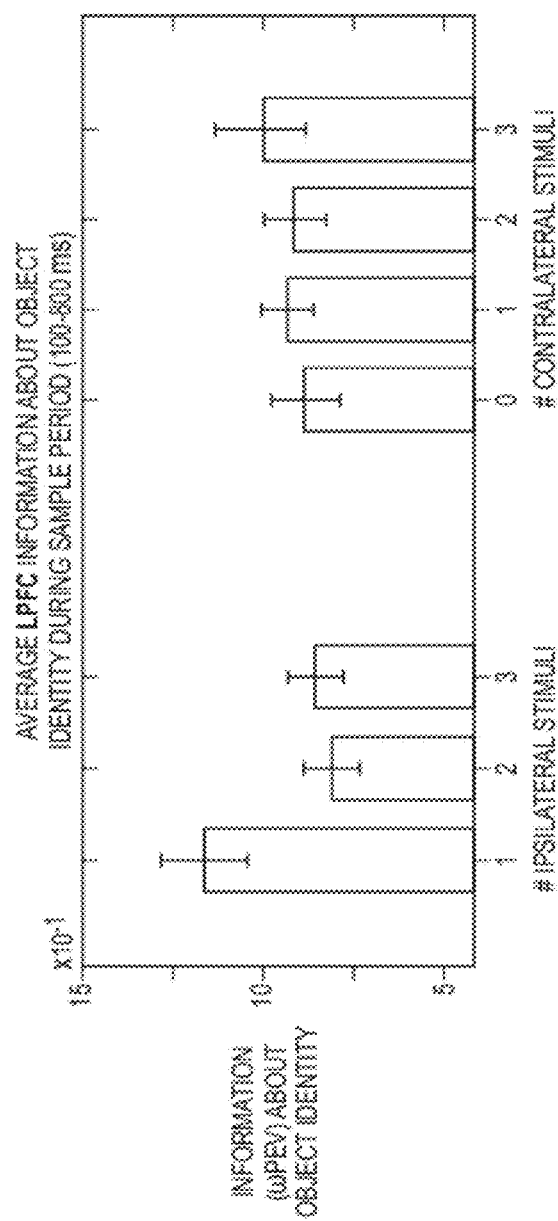
FIG. 7D is a graph further illustrating example data obtained using the cognitive capacity test of FIG. 6A. Information was lost in lateral prefrontal cortex (LPFC) neurons over the sample period (100-800 ms after stimulus array onset) as items were added ipsilateral to the encoded object (left). However, adding contralateral items (right) had no impact on neural information, matching the observed behavioral effects. All error bars indicate 95% confidence intervals.

The animals' behavioral capacity was estimated using an information theoretic approach. This method fully accounts for chance behavior and makes no assumption about the animal's strategy in solving the task. First, the animal's information about each display was determined from their behavioral performance (see Supporting Information for details). By combining these Applicants were able determine the information the animal had about displays with a given number of objects (FIG. 6C). Hemifield information was determined by decomposing the total information in a given array into each hemifield's display (see Supporting Information). Again, this can be combined for displays of a given size to estimate the animal's capacity in each hemifield (FIG. 7C).

Neural Information about Stimulus Identity.

Applicants quantified the information each neuron's firing rate carried about the identity (color) of each object in the hemifield contralateral to the recorded hemisphere using a bias-corrected percent explained variance (ωPEV) statistic (see Supporting Information). In order to ensure the analysis was unbiased, all well-isolated neurons were recorded and the analysis made no a priori assumptions about the structure of color or location information in neural activity across time or display conditions. All neurons that showed significant information (i.e., object selectivity) to any stimulus in the sample array are reported (68 neurons in LIP, 189 neurons in LPFC, and 97 neurons in FEF). Information was averaged across all selective neurons and all attempted trials, unless specified otherwise (such as for the correct or error-only trials, FIGS. 9A-9B).

Timing of Information Loss.

Two different latencies were of interest: when did neurons first encode information about a stimulus and when was this information degraded due to capacity limitations. For the former, Applicants asked when the amount of information in a neuron population significantly exceeded baseline. For the latter, Applicants determined the latency of a significant difference in neural information between below- and above-capacity conditions (e.g., one vs. two objects). For both measures the latency was defined as the time point of maximum rise in the difference function. The maximum rise statistic was used as it is resistant to differences in statistical power: varying the number of neurons in a population will change the threshold of significance, but will not a priori affect the shape of the function and therefore will not change the point of maximum slope. The search for the point of maximum rise was limited to a 150 ms window around the first time a significant difference was found (e.g. 191 ms in LIP for greater information in below-capacity trials compared to above-capacity trials). Uncertainty about the time to significance was determined by bootstrapping the population of neurons and re-determining the point of maximum slope.

Supporting Information: Materials and Methods

Two male rhesus monkeys, Sp and Si, weighing 13 and 6 kg respectively, were trained on a visual working memory task (see FIG. 6A and associated description). All procedures followed the guidelines of the MIT Committee on Animal Care and NIH. Animals were prepared using standard procedures. Chambers were stereotaxically placed over frontal and parietal cortices (in the same hemisphere) using structural MRI scans. Novel software was developed in MATLAB® that produced three-dimensional models of each animal's skull and brain in stereotaxic coordinates. This allowed accurate placement of electrode penetrations into lateral prefrontal cortex, frontal eye fields, and lateral intraparietal cortex simultaneously. Epoxy-coated tungsten electrodes (FHC Inc, Bowdoin ME) were used for recording as well as for microstimulation. Electrodes were lowered using a custom-built microdrive assembly that lowered electrodes in pairs from a single screw. The microdrive assembly was designed to allow for a high density of electrodes (1 mm spacing) in order to maximize the number of simultaneously recorded neurons across the three regions of interest. The electrodes were acutely lowered through an intact dura at the beginning of every recording session and allowed to settle for a minimum of two hours before recording. This ensured stable isolation of the activity single neurons. After each recording session, the electrodes were retracted and the microdrive assembly was removed from the well.

Spiking activity was recorded across a maximum of 50 electrodes simultaneously. Both spiking activity and local field potentials were referenced to ground. The signal from each electrode was divided into spiking activity and a local field potential by filtering between 154 Hz and 8.8 kHz for spikes and between 3.3 and 88 Hz for the local field potential. Only spiking data were analyzed for the results reported herein. Waveforms were stored and single neural activity was sorted from the raw spiking activity signal off-line using a combination of principal component analysis of waveform traces along with other properties of the recorded waveforms (amplitude, trough/peak latency, etc). An infrared-based eye-tracking system monitored eye position at 240 Hz. Behavioral control of the paradigm was handled by the Monkeylogic program. All analysis code was custom written in MATLAB® or C.

Behavioral Task

The trial was initiated when the animal fixated a point at the center of the screen. Fixation was required within 1.75 degrees of visual angle (dva) of the fixation point. After a short fixation period (500 ms), the animal was presented with an array of colored squares for 800 ms. A long stimulus period was chosen to ensure the animal had enough time to fully attend-to and process all of the items in the array. After the sample period the stimuli were removed and the animal was required to maintain fixation for a memory delay that ranged from 800 to 1000 ms. Following the memory delay, a test array was presented. The test array was identical to the sample array except that the color of a single stimulus was changed. The animal's task was to make a single, direct, saccade to the changed object.

Six new stimulus locations were chosen each day. There were always three locations in each visual hemifield, ranging from +/−75 angular degrees from horizontal meridian and between 4 and 6 dva from fixation. Stimuli were colored squares 1 dva on a side. Two colors were chosen for each location every day. This was changed each day, to prevent monkeys from adopting any long-term memorization strategy. The colors were drawn from a pre-defined population of 14 colors in a random manner as long as two colors were not too difficult to discriminate at a particular location (i.e. red and pink were never paired). This process ensured a large degree of variety in the stimuli used on a particular day and thus required the animals to encode and hold in memory the array presented on each trial and detect its change rather than memorizing fixed stimulus-response associations. The location of the target item (which was the stimulus that flipped from one of the color pair in the sample array to the other in the test array) was chosen randomly on each trial.

The total number of stimuli in the visual array varied from two to five items on each trial. Early in training the number of total stimuli in the array was chosen randomly. However, Applicants noticed both animals showed behavioral evidence of independent capacities in each hemifield (FIGS. 7A-7D). Anticipating the need to compare trials with one, two, and three objects in a hemisphere, Applicants then equalized the number of trials in each of these conditions. Therefore, the constellation of the stimuli used was pseudo-randomly chosen such that both the distribution of trials with one, two, or three items in the target's hemifield and the distribution of total number of stimuli in a trial was flattened. This process did not alter the probability of the target location.

The animals performed a minimum of 720 correct trials during recording sessions, ensuring at least 20 trials for each target, color, and number of ipsilateral stimuli conditions. Both monkeys performed the task well above chance and with similar capacities. Only trials during which the animal was consistently attempting the task were used—three out of five trials in any given period had to be attempted to be included. Non-attempted trials were failing to initiate the trial or broken fixation before the trial was completed. For the main analysis (FIG. 7D and FIGS. 8A-8C) all attempted trials (correct or error) were used, regardless of the target location. For correct/error analyses, only trials where the animal correctly/incorrectly identified a change at a given object were used.

Estimating Information from Behavior

In order to understand how capacity limitations are reflected in neural activity, Applicants first must estimated the animals' behavioral capacity. This was done with an information theoretic approach which fully accounts for chance behavior and makes no assumption about the animal's strategy in solving the task. Applicants were interested in knowing how much information the animal had about a given stimulus display. As the animal uses this information to making its behavioral choice, this is equivalent to asking how much information the animal's choice provides about where the target is located: I(target; behavior)=H(target)−H(target|choice), where $H(x)=-\Sigma_i^N p(x_i)*\log_2 p(x_i)$ is the uncertainty of x. The uncertainty of the location of the target, H(target), was determined directly from the likelihood of the target appearing at each possible location in the display (i.e. a flat distribution). The uncertainty of the target, given the animal's choice, was equal to the probability the target was at each position given the animal chose a particular location.

This process directly provides the information for a stimulus array (FIG. 6C), but Applicants were also interested in the information the animal had about each hemifield. The animal's behavior and neural activity showed the two hemispheres were independent, allowing estimation of the information for the display in each hemifield directly from the total display:

I(display)=I(left display)+I(right display). For example, given a particular display:

$$I\begin{pmatrix} X \\ X \\ X \end{pmatrix} = I\begin{pmatrix} X \\ \\ \end{pmatrix} + I\begin{pmatrix} \\ X \\ X \end{pmatrix}.$$

As there were 56 unique total stimulus displays, and eight unique displays for the left and right sides, the set of linear equations can be solved in order to estimate the information for each hemifield. These are then used to estimate the average information given the number of stimuli in the hemifield (FIG. 7C) and show that both animals had a capacity limit between one and two items in each hemifield.

Determining Whether Behavioral Information was Capacity Limited

To determine whether the information the animals had about the display (FIGS. 6C and 7C) was capacity limited a model selection approach can be used. The observed information was modeled with both a linear curve, $I=\beta_1 x+\beta_0$, and a capacity limited curve, $$I = \begin{cases} \beta_1 x + \beta_0, & x < c \\ \beta_1 c + \beta_0, & x \geq c. \end{cases}$$

The goodness-of-fit was compared using both a validation test and the Bayesian Information Criterion (BIC). For the validation test a randomly-selected subset of the trials (70%) were used to estimate the parameters of each model in turn. The predicted values from each model were then compared to the reserved trials in order to measure the error in the model fit. This process 'validates' how well the model captures the data without over-fitting. By repeating this process multiple times a distribution of the difference in errors for the two models can be generated. The validated errors for the capacity-limited model were significantly lower than the linear model for the information about the total display (FIG. 6C, p=0.026). This difference was greater for the ipsilateral information (FIG. 7C, $p=4.4*10^{-4}$). Alternatively, one can use the BIC to test how well models fit the observed data while correcting for differences in the number of free parameters. As with the validation test, the capacity-limited model was found to fit better (have a lower BIC) for both the total ($BIC_{linear}=-24.9$, $BIC_{cap-lim}=-31.0$) and ipsilateral displays ($BIC_{linear}=-17.4$, $BIC_{cap-lim}=-21.8$). Both of these tests confirm that the capacity-limited model fits the observed behavioral data better than a simpler linear model, suggesting the monkeys' behavior was indeed capacity limited.

Estimating Capacity from Behavior

Although estimating the information available to the animal from their behavioral performance fully accounts for chance levels and alternative strategies it is difficult to directly compare to previous human psychophysical work. Therefore, the capacity for each animal was computed using a behavioral model similar to that previously used in human capacity limitation studies. The animals were modeled to correctly remember c objects worth of information on a given trial (their capacity). This limit was not necessarily discrete and partial object information was allowed (e.g. 3.7 items). The animals' baseline performance was taken to be b in order to compensate for fixation breaks, periods of inattention, etc. Using these two parameters, their likelihood of getting a trial correct was modeled as:

$$p(n) = \begin{cases} b, & n \leq c \\ b\dfrac{c}{n}, & n > c, \end{cases}$$

where n is the number of objects in the visual array (either within a hemifield or across the entire visual scene depending on whether the hemifield or total capacity were being estimated). Confidence intervals were estimated by bootstrapping procedure: a new population of trials (from the over 42,000 recorded) was randomly selected (with replacement) and the parameters were re-estimated. Repeating this process 1000 times resulted in a distribution for each parameter from which 95% confidence intervals (95% CI) were determined. However, it should be noted that this model-based approach does not fully accommodate for alternative strategies (such as an exclusionary strategy) or guessing. This is typically corrected in human psychophysical work by subtracting the false alarm rate from the hit rate, but this becomes complicated when capacities between hemifields are independent but guessing is not (as the animal can only make one choice). However, the estimate from this simple behavioral model is well-aligned with the plateau observed in the information theoretic analysis (which fully compensates for any of these strategies), suggesting the animals were not adopting a complicated behavioral strategy.

Recording Locations

A total of 50 electrodes were implanted into parietal and frontal cortex simultaneously, up to 25 in each anatomical area. Data is presented from 28 sessions (14 in both Si and Sp). A total of 1334 neurons were recorded across all three anatomical regions in two monkeys (339 from the lateral intraparietal area, LIP; 640 neurons from lateral prefrontal cortex, LPFC; and 355 neurons from the frontal eye fields, FEF). Applicants chose to record from frontal and parietal cortex as both regions have been implicated in working memory and capacity limitations. Furthermore, all three regions have been previously shown to encode stimulus color, particularly when task-relevant. A total of 540 neurons were recorded from monkey Si and 794 neurons from monkey Sp. Similar behavioral and electrophysiological results were obtained from each animal alone, so they are combined for presentation.

The lateral intraparietal region (LIP) recording well was placed at approximately 4 mm AP from the interaural plane and was placed using structural MRIs. To identify LIP neurophysiologically, the animals were trained on a delayed saccade task. During central fixation, a brief spot of light was flashed in the periphery. After a memory delay, the fixation point was extinguished and the animal made a saccade to the remembered location of the light spot. This has been used to isolate LIP from surrounding regions, as it is the only region in the parietal cortex that shows spatially selective memory delay activity. The animals performed the delayed saccade task at the beginning of every recording session. Electrodes were only considered to be within LIP for that session if a neuron isolated from that electrode showed memory delay activity selective for the remembered location ($p<0.05$ using ωPEV statistic).

The frontal recording well was placed at approximately 32 mm AP from the interaural plane. Microstimulation was used to demarcate the frontal eye fields from dorsolateral prefrontal cortex. Stimulation was delivered as a 200 ms train of bi-phasic pulses with a width 400 μs and an inter-pulse frequency of 330 Hz using the same electrodes used for recording. Current level was started at 150 μA and reduced to find the threshold at which an eye movement vector was elicited 50% of the time. Only sites that had thresholds of stimulation amplitudes less than 50 μA were classified as belonging to the frontal eye fields. Anterior sites were classified as belonging to the LPFC. In general, stimulation at LPFC sites did not elicit eye movements even at the highest current amplitude tested (150 μA).

For the analysis of the overall loss of information (FIGS. 8A-8C), each neuron's activity was required to have been recorded for a minimum of 30 trials for each object location. This yielded a population of 284 LIP neurons, 584 LPFC neurons, and 325 FEF neurons. However, this requirement was relaxed to 15 trials for the correct-alone (FIG. 9A) and 5 trials for correct vs. error (FIG. 9B) analyses, as these analyses required the analyzed object to be the eventual target. In addition, only selective neurons (assessed across all trials, see below) were used. This yielded 41 selective LIP neurons, 130 selective LPFC neurons, and 67 selective FEF neurons included in the correct/error analysis (FIGS. 9A-9B).

Information from Individual Neuron Firing Rates

The factor of interest was the color identity of each object in the array, which was not known to the monkey before the trial began. The key question was how neural information about color identity of the objects changed as the number of objects to be encoded and remembered was increased. Applicants assessed selectivity for the identity of each stimulus for each neuron using a percent explained variance (PEV) statistic. The PEV reflects how much of the variance in a neuron's firing rate can be explained by the color identity of a particular stimulus. Typically, PEV is expressed as eta-squared:

$$\eta^2 = \frac{SS_{Between\ Groups}}{SS_{Total}}$$

where $SS_{Total}=\Sigma_i^N(x_i-\overline{x})^2$ and $SS_{Between\ Groups}=\Sigma_{group}^G n_{group}(\overline{x}_{group}-x2)$. Unfortunately, for lower sample sizes, the eta-squared statistic has a strong positive bias. Therefore, for all of the statistics in the current manuscript Applicants used the omega-squared statistic (ωPEV):

$$\omega^2 = \frac{SS_{Between\ Groups} - d.f. * MSE}{SS_{Total} + MSE}$$

where d.f. is the degrees of freedom (i.e. the number of groups, G, minus 1) and MSE is the mean squared error, $MSE=\Sigma_i^N(x_i-\overline{x}_{group})^2$. Omega-squared is an unbiased measure, resulting in a zero-mean statistic when there is no information. However, it is important to note that while the mean of omega-squared is unbiased, the distribution of observed values still varies with the number of observations (i.e. the skew of the distribution). Therefore, for all of the comparisons, conditions were balanced for the number of trials in each group. This was done by stratifying the number of trials in each group to a common value: a random subset of trials was drawn (equal to the minimum trial number across groups) and the statistic was calculated. This process was repeated 25 times and the overall statistic was taken to be the average of the stratified values.

To determine whether and when the observed level of ωPEV was significantly different from chance, a randomization test was used. The association between neural activity and stimulus identity was randomly shuffled and the ωPEV was re-calculated. By repeating this process 500 times a null distribution was constructed. The observed ωPEV was then compared to this null distribution in order to determine the likelihood of the observed ωPEV. The timecourse of ωPEV was calculated in windows of 100 ms, slid every 10 ms. Neurons were independently tested for selectivity within the sample period (0 to 800 ms from the onset of the visual array) and the delay period (0 to 800 ms from the offset of the visual array).

A threshold for the amount of information to reach statistical significance was determined for each window by dividing the typical significance threshold ($p<=0.05$) by the number of comparisons made across each window. A neuron was considered selective for object identity if its likelihood reached the significance threshold for two independent windows of time (i.e. two consecutive 100 ms windows). This process corrected for multiple comparisons across time and reduced the chance that the selective responses were due to non-physiological anomalies.

As used here the ωPEV statistic makes one assumption: neurons encode stimuli by modulating their average firing rate within the analyzed window of time. Importantly, it does not make any assumption about the consistency of neural response over time or between displays of different sizes. The ωPEV statistic allows one to take an agnostic approach to decoding information about stimulus identity in different conditions (and across time), capturing as much of the selectivity as possible and avoiding any bias across conditions.

Testing for Significance on Neuron Population Level

Applicants determined when the amount of average object information across the neuron population reached significance (above baseline) by a non-parametric, paired, Wilcoxon signed rank test. As Applicants only examine neurons whose firing rate carried significant object information, the population will necessarily be biased above zero. In order to compensate for this, the first 50 ms were chosen as the baseline period, averaged over all three conditions (i.e. ignoring the number of stimuli in the array). As this time period fell within the time window of selection, any bias due to selecting the neurons alone was corrected. Furthermore, as the baseline is averaged across all three conditions this should not lead to any bias in the observed timing differences for each condition (see below for this procedure).

Significant differences between below-capacity and above-capacity conditions were determined using a randomization test. Briefly, the association between observed information (in a given 100 ms window) and the number of stimuli on the screen was broken by randomly shuffling conditions. The average difference in population information was determined for each random shuffle. This process was repeated 1000 times and the observed difference in information was compared to the population of randomized values in order to determine the likelihood of seeing the observed value by chance. The first time this likelihood fell below 5% for both one vs. two and one vs. three was taken as the time-to-first significance. However, as this measure can be biased by statistical power, a different statistic was used to measure the time to significant deviation: the point of maximum rise in the difference function (below capacity-above capacity). This is explained next.

Details of the Latencies of Neural Information

As noted above, the time-point at which selectivity for the identity of an object exceeded baseline depended on whether the displays were above or below capacity. When the display was below the animal's capacity (i.e. one object in the hemifield), object information appeared in LIP at 193 ms after the onset of the visual array (95% confidence interval, 149-229 ms). This was followed by responses in LPFC (317 ms; 95% CI, 249-359 ms) and FEF (291 ms; 95% CI, 249-339 ms). This is consistent with a bottom-up flow of sensory inputs from posterior to anterior cortex (LIP<LPFC, $p<10^{-3}$; LIP<FEF, $p=3*10^{-3}$, randomization test). There was no significant difference between the two frontal regions (FEF<LPFC, p=0.23, randomization test).

Information about the object's identity was seen in the reverse order when the display was above capacity (two or three objects per hemifield): first in LPFC and FEF, followed by LIP. Significance in LPFC occurred at 315 ms (95% CI, 249-339 ms) and 318 ms (95% CI, 259-359 ms) after visual array onset for two and three items, respectively. FEF was at approximately the same time: 322 ms (95% CI, 289-409 ms) and 290 ms (95% CI, 249-309 ms) for 2 and 3 items, respectively. Significant information about two or more objects was not observed in LIP until 527 ms (95% CI, 439-549 ms) and 474 ms (95% CI, 399-539 ms) after the array onset. This was significantly earlier in LPFC and FEF than LIP (LPFC<LIP, $p<10^{-3}$; FEF<LIP, $p<10^{-3}$, by randomization test for both two and three objects). Again, there was no significant difference between the frontal regions (LPFC<FEF, p=0.49 for two items, FEF<LPFC, p=0.23 for three items).

This pattern of results suggests top-down input may be important for representing object identity information when the visual array is above the animal's capacity. Indeed, the difference in selectivity in LIP was significantly later in above-capacity trials compared to below-capacity trials (1<2, $p<10^{-3}$; 1<3, $p<10^{-3}$, randomization test). However, there was no significant difference in the timing of selectivity for above-capacity conditions in LIP (3<2, p=0.09) or for any condition in either LPFC (2<1, p=0.38; 1<3, p=0.35; 2<3, p=0.38, randomization test) or FEF (1<2, p=0.48; 3<1, p=0.30; 3<2, p=0.49, randomization test).

Loss of Information Between Two and Three Item Displays

The shared resource hypothesis predicts that an information source is divided amongst the objects currently remembered. Therefore, information about a stimulus in a three-item display should be reduced from when that stimulus is in a two-item display. While this is seen late in the delay period for LPFC neurons (FIG. 8B, right), no significant difference was observed during the sample period. As noted above, one interesting hypothesis is that this difference in information loss reflects a difference in capacity between these two time periods. For example, when the stimuli are present (or were recently present) the visual trace may provide a source of information that is less limited (or even unlimited). However, this argument extends from a negative finding (that there was no significant difference between two and three objects), making it difficult to interpret. As the expected difference in information per stimulus decreases with added items (i.e. from one unit of information compared to ½ and then from ½ compared to ⅓) the ability to resolve the difference is reduced, possibly leading to an inability to observe a significant difference. However, this concern is mitigated by the fact that one can resolve the difference late in the trial.

Loss of Information for Individual Neurons

The loss of information above capacity is clear on a population level (FIGS. 8A-8C and FIGS. 9A-9B). However, this loss could either be an effect that is exclusive to the population level or it could occur for individual neurons. To investigate this, Applicants isolated neurons that were significantly selective (p<0.05) for the same object in both below-capacity and above-capacity displays. Although this process greatly reduced the number of neurons in the population (38 from LPFC, 13 from FEF, and 4 from LIP), the large majority of neurons in all three regions showed a decrease in selectivity during above-capacity trials in comparison to below-capacity trials (32 out of 38 in LPFC, 11 out of 13 in FEF, and all four in LIP). This was significantly above chance across all three areas ($p=4.0*10^{-8}$) as well as for LPFC ($p=1.2*10^{-5}$), FEF (p=0.011), and trending for LIP (p=0.0625, limited by small sample size surviving the multiple selection).

Selectivity on Correct and Error Trials

As noted in above, Applicants observed a significant reduction in object information in all three areas (for the time-periods of interest) when a second object was added to the visual display. To perform this analysis only information about the correctly identified target was used. Unfortunately, this restriction, coupled with the decaying behavior with three items in a hemifield did not allow for analysis of three-item displays in the correct-only analyses.

Applicants observed a significant amount of object information in LPFC neurons during error trials alone (for both the sample, FIG. 9B, and delay, see above). This was also tested across the entire population of LPFC neurons by determining whether there were a significant number of neurons carrying significant object information using error trials alone. As for the correct-error comparison, the analysis was limited to the two-item condition (where there were sufficient error trials). The information criterion was the same used for all trials (i.e. selectivity in two independent 100 ms windows, see above). As before, Applicants found a significant number of LPFC neurons conveying object information (p=0.0056) during the sample period and delay period (p=0.0534), confirming the original finding of object identity information, even when that object is "forgotten".

In addition to LPFC neurons, FEF neurons also carried significant object information during error trials with two items in the display (average of 0.83 percent explained variance, bias corrected; p=0.024, permutation test). This was less than during correct trials (1.2 percent explained variance, bias corrected) although the difference did not reach significance (p=0.31), possibly due to the small sample size (67 neurons) and small number of error trials at each target location. LIP neurons did not carry any significant information about stimuli during two-item conditions (FIG. 9A).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of displaying information in a manner that accounts for cognitive capacity in a subject, the method comprising:
    monitoring a subject's gaze with a monitor unit, the monitor unit tracking a subject's eye position with a camera;
    capturing at least one metric representative of a subject's independent cognitive capacities corresponding to a subject's left and right halves of visual space, the capturing using a test to measure the subject's independent cognitive capacities, the test being administered by displaying a stimulus array to the subject and eliciting a behavioral response from the subject, the behavioral response being captured via an input device or the camera;
    generating representations of information to be presented in a manner accounting for the independent cognitive capacities corresponding to the subject's left and right halves of visual space based on the at least one metric, the representations being presented in the subject's left and right halves of the visual space based on the subject's gaze, wherein generating the representations is implemented in a processor of a computer, using an adjustment unit configured to adjust displaying of the representations based on the at least one metric, and wherein generating the representations includes an assignment unit, assigning weightings of importance to the information and using the weightings to present the representations in the subject's left half of the visual space or the right half of the visual space with zero or few other representations;
    determining positions within the subject's left and right halves of the visual space for the representations as a function of the subject's gaze as monitored by the monitor unit, wherein determining includes distributing the positions across the subject's left and right halves of the visual space as a function of the at least one metric; and
    displaying in a display, the representations in accordance with the positions using an alignment module for aligning the representations with a current field of view of the subject based on the subject's gaze, to the subject viewing the display.

2. The method according to claim 1, wherein generating the representations includes using a temporal profile in the subject's left or right half of the visual space to maintain cognitive capacity performance in connection with a respective half.

3. The method according to claim 1, wherein generating the representations includes inspecting content of the information and determining the positions on the display to present the content as a function of the information previously, currently, or in the future displayed on the display.

4. The method according to claim 1, further comprising dividing the current field of view of the subject based on the subject's gaze to account for the independent cognitive capacities corresponding to the subject's left and right halves of the visual space.

5. The method according to claim 4, wherein the display includes a heads-up display, and further comprising shifting the heads-up display to align with the current field of view.

6. The method according to claim 1, further comprising assuming the subject's gaze and dividing the current field of view of the subject to account for the subject's independent cognitive capacities of the subject's left and right halves of the visual space.

7. The method according to claim 1, wherein capturing the at least one metric includes capturing the at least one metric representative of the subject's independent cognitive capacities generally using data of an average population of independent cognitive capacities.

8. The method according to claim 1, further comprising adjusting the display of the representations as a function of the at least one metric representative of the subject's independent cognitive capacities.

9. The method according to claim 8, wherein adjusting the display includes adjusting any of number, position, size, color, distribution, density, and symmetry of the representations in the display.

10. The method according to claim 9, wherein adjusting the display includes reducing the number of representations in the display when the at least one metric representative of the subject's independent cognitive capacities is low.

11. The method according to claim 1, wherein the representations are presented for independent training of left and right halves of a subject's brain to enhance cognition.

12. The method according to claim 11, wherein the training is therapeutic and includes using knowledge of location of a brain injury.

13. The method according to claim 11, wherein the training includes using knowledge of any combination of gender, age, and education.

14. The method according to claim 11, wherein the independent training includes simultaneous training of the left and right halves of the subject's brain to enhance cognition.

15. The method according to claim 11, further comprising adapting the training based on the at least one metric.

16. The method according to claim 15, wherein adapting the training includes adapting the training to compensate for working memory deficits of the subject.

17. The method according to claim 11, wherein the training is application specific.

18. The method according to claim 17, wherein the application includes any of human-to-computer interfacing, human-to-machine interfacing, quality assurance monitoring, security monitoring, medical monitoring, or air traffic controlling.

19. The method according to claim 11, wherein the representations are presented in overlapping migration in one half of the visual space, or from the left half to the right half of the visual space, or from the right half to the left half of the visual space.

20. The method according to claim 11, further comprising dividing the current field of view of the subject based on the gaze to account for the independent cognitive capacities of the subject's left and right halves of the visual space.

21. The method according to claim 1, further comprising adjusting the displaying as a function of non-visual activities.

22. The method according to claim 21, wherein the non-visual activities include any of distractions, emotions, time of day, time of month, time of year, age of the subject viewing the display, or combinations thereof.

23. The method according to claim 1, further comprising adjusting the displaying as a function of vigilance of the subject viewing the representations.

24. The method according to claim 1, wherein generating the representations includes filtering the representations in a manner accounting for the independent cognitive capacities.

25. The method according to claim 1, wherein the representations are presented according to a tag associated with the information.

26. A display system configured to account for cognitive capacity in a subject, the display system comprising:
a monitor unit to monitor a subject's gaze, the monitor unit including a camera to track a subject's eye position;
a capture unit to capture at least one metric representative of a subject's independent cognitive capacities corresponding to a subject's left and right halves of visual space, using a test to measure the subject's independent cognitive capacities, the test being administered by displaying a stimulus array to the subject and eliciting a behavioral response from the subject, the behavioral response being captured via an input device or the camera;
a presentation unit implemented in a processor of a computer, the presentation unit configured to generate representations of information to be presented in a manner accounting for the subject's independent cognitive capacities corresponding to the subject's left and right halves of the visual space based on the at least one metric, the representations being presented in the subject's left and right halves of the visual space based on the subject's gaze, the presentation unit further configured to determine positions within the subject's left and right halves of the visual space for the representations of information as a function of the subject's gaze as monitored by the monitor unit, including distributing the positions across the subject's left and right halves of the visual space as a function of the at least one metric, wherein the presentation unit includes an assignment unit configured to assign weightings of importance to the information, and wherein the weightings are used to present the representations with zero or few other representations in the subject's left or right half of the visual space;
an alignment module coupled to the presentation unit and configured to align the representations with a current field of view of the subject based on the subject's gaze;
a display operatively coupled to the presentation unit to display the representations in accordance with the positions to the subject viewing the display; and
an adjustment unit configured to adjust the display of the representations based on the at least one metric.

27. The display system according to claim 26, wherein the monitor unit is configured to notify the display how to divide the current field of view of the subject based on the subject's gaze to account for the subject's independent cognitive capacities of the subject's left and right halves of the visual space.

28. The display system according to claim 27, wherein the display produces a heads-up display and wherein the alignment module is configured to spatially shift the heads-up display to align with the current field of view of the subject.

29. The method according to claim 1, wherein the monitor unit includes an infrared camera.

30. The method according to claim 1, wherein the test is administered using the display or a stimulus display to display the stimulus array to the subject.

31. The method according to claim 1, wherein capturing the at least one metric includes estimating a total capacity based on the behavioral response and determining the independent cognitive capacities from the total capacity.

32. The display system according to claim 26, wherein the test is administered using the display or a stimulus display to display the stimulus array to the subject.

33. The display system according to claim 26, wherein the capture unit is configured to capture the at least one metric by estimating a total capacity based on the behavioral response and determining the subject's independent cognitive capacities from the total capacity.

* * * * *